Jan. 5, 1960            C. B. TRIMBLE            2,919,855
REVERSIBLE ELECTRONIC ACCUMULATORS
Filed April 13, 1956            8 Sheets-Sheet 1
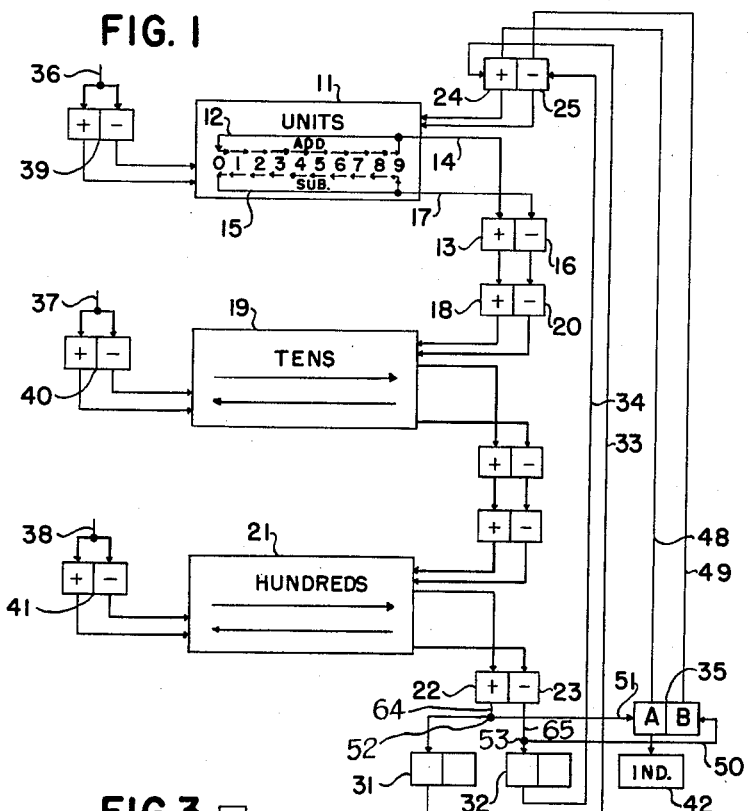
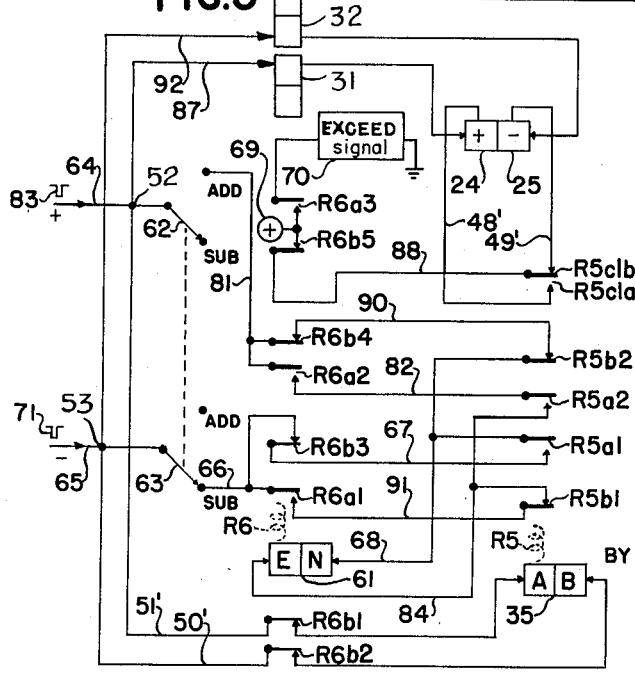
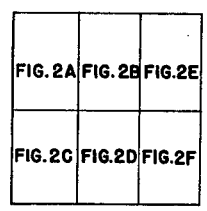
INVENTOR
CEBERN B. TRIMBLE
HIS ATTORNEYS Jan. 5, 1960　　　　C. B. TRIMBLE　　　2,919,855
REVERSIBLE ELECTRONIC ACCUMULATORS
Filed April 13, 1956　　　　　　　　　　　8 Sheets-Sheet 4
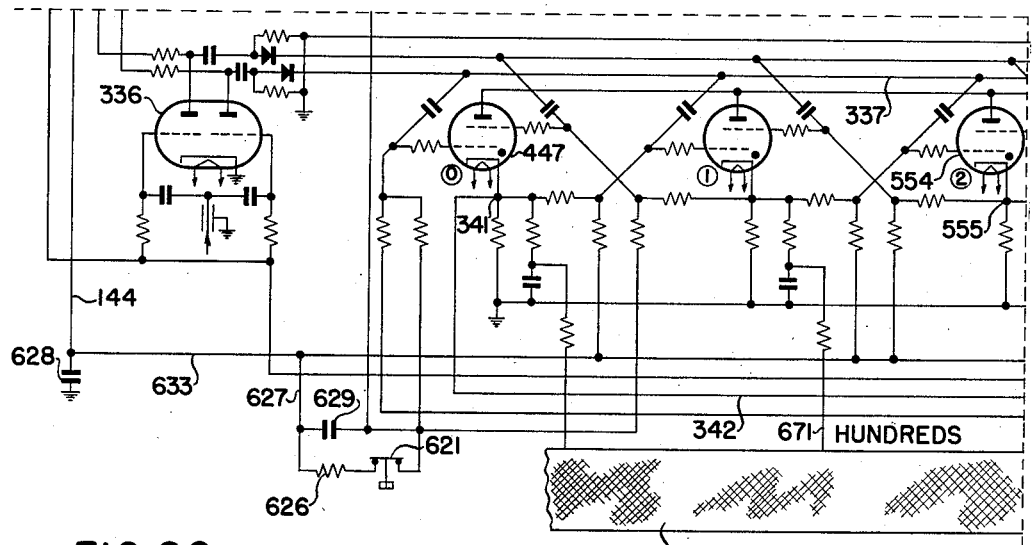
FIG. 2C
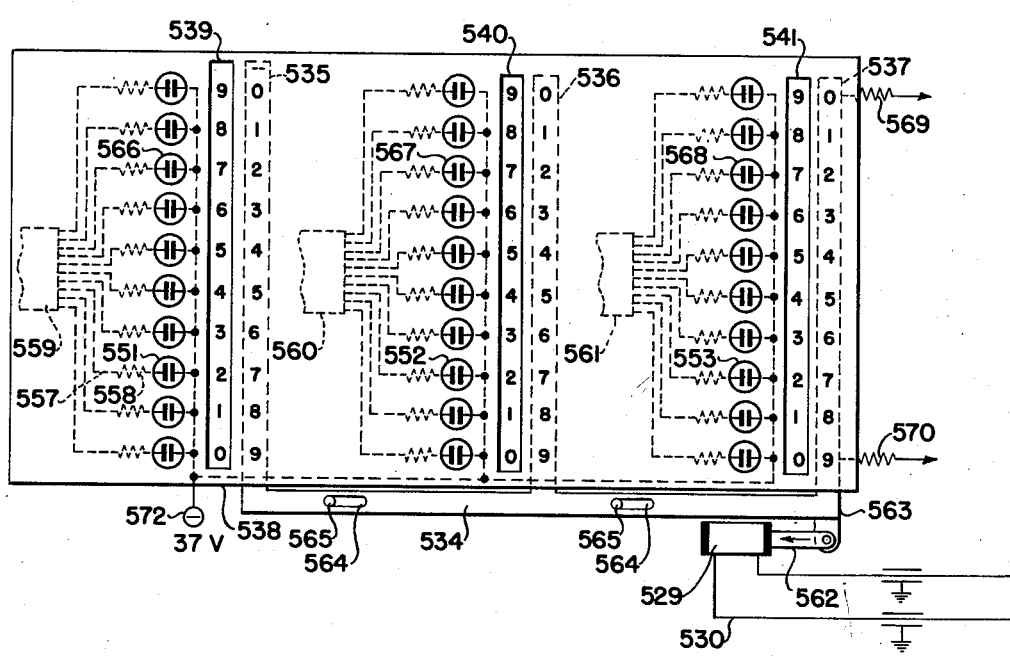
INVENTOR
CEBERN B. TRIMBLE
BY
HIS ATTORNEYS

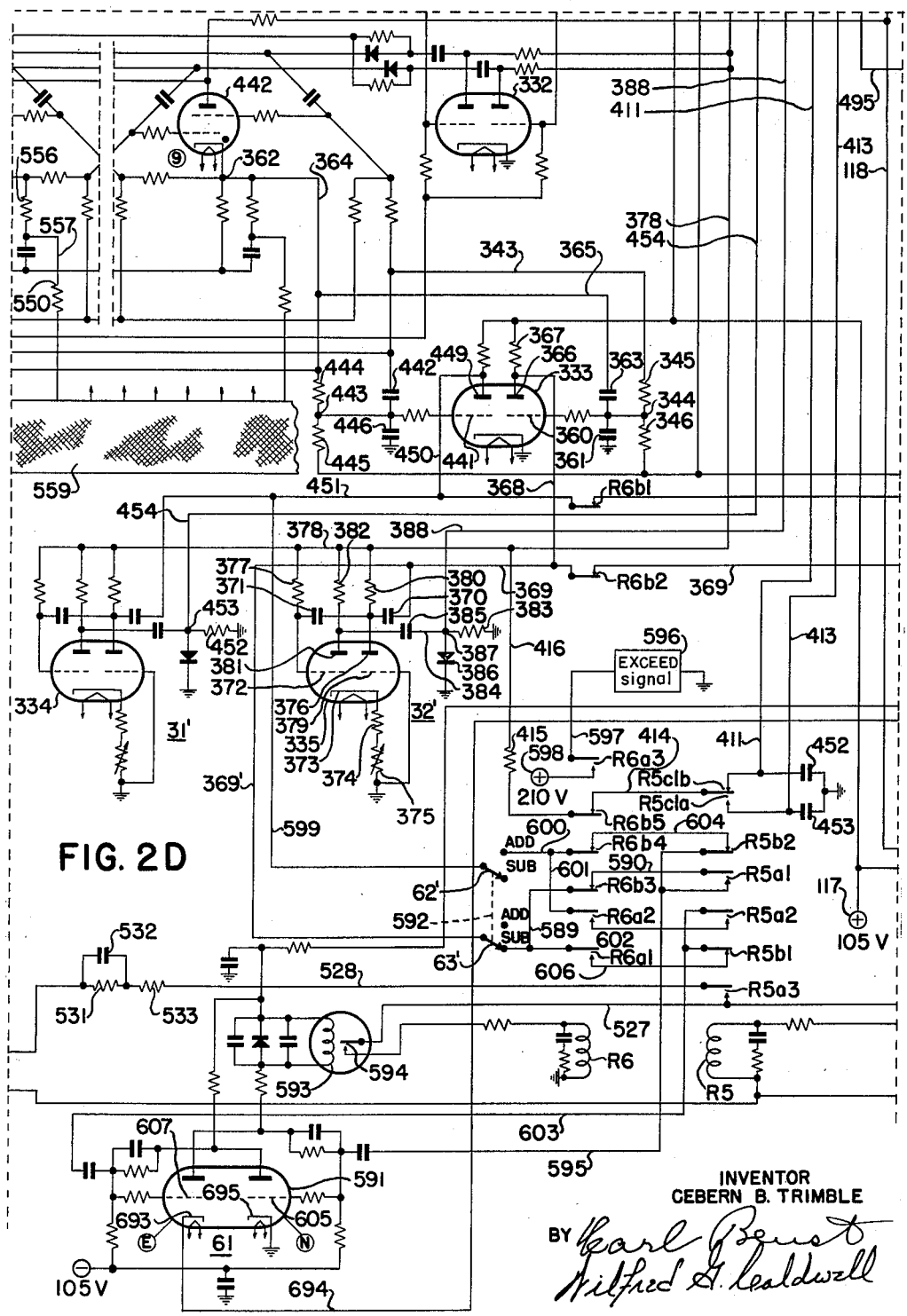

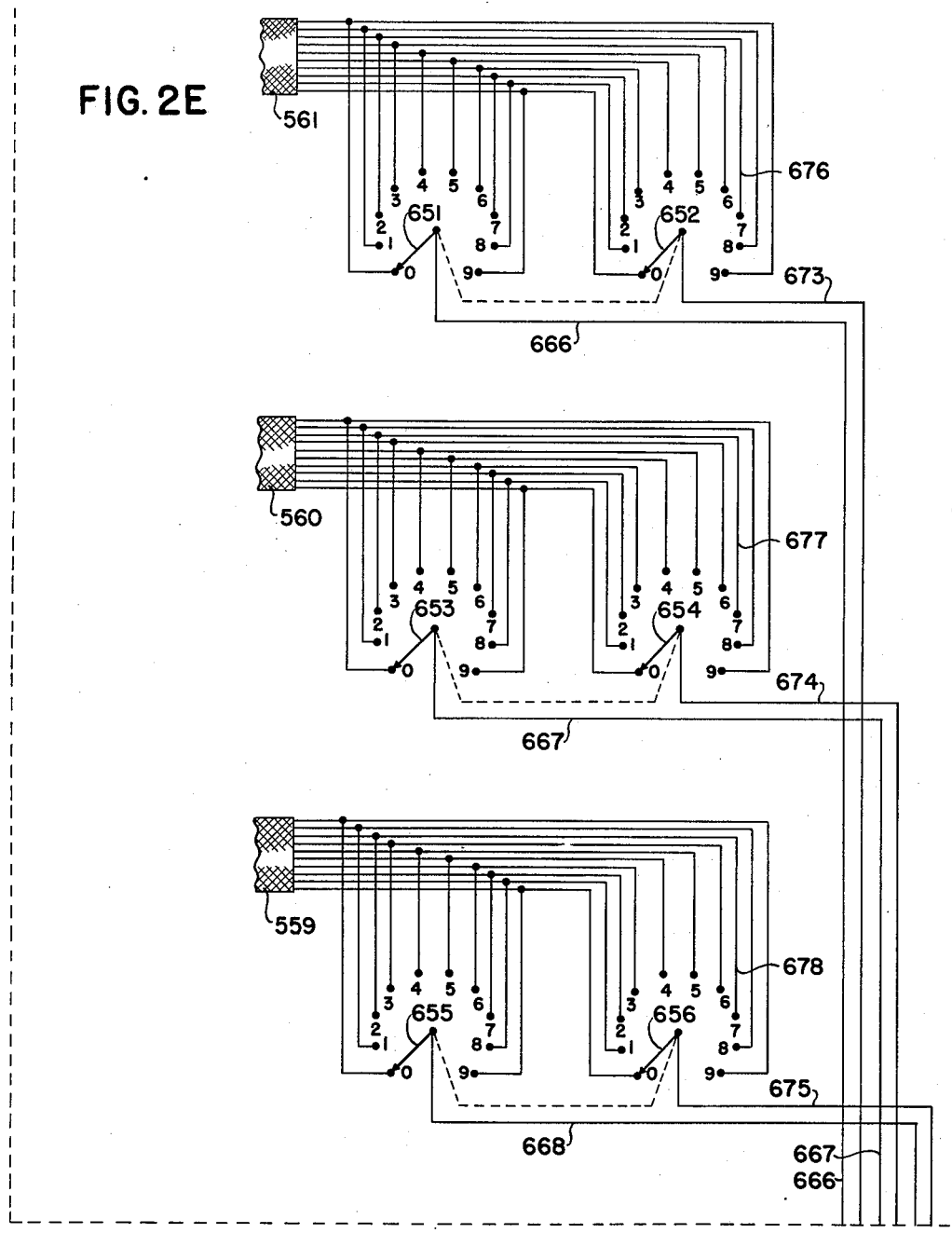

INVENTOR
CEBERN B. TRIMBLE

HIS ATTORNEYS

Jan. 5, 1960    C. B. TRIMBLE    2,919,855
REVERSIBLE ELECTRONIC ACCUMULATORS
Filed April 13, 1956    8 Sheets-Sheet 8

FIG. 4

| CASE | f | ±F | BAL | A | B | R5 | AB OPEN CIRCUIT | AB ROUTE | E | N | CAP | R6 | EN OPEN CIRCUIT | EN ROUTE | 408 | 409 | ±C OPEN CIRCUIT | ±F ROUTE |
|---|---|---|---|---|---|---|---|---|---|---|---|---|---|---|---|---|---|---|
| I BEFORE | − | | REAL | | ON | OFF | | | | ON | IN | OFF | | | B+ | | | |
| I AFTER | | | REAL | | ON | OFF | | | | ON | IN | OFF | | | B+ | | | |
| II BEFORE | − | | REAL | | ON | OFF | | | | ON | IN | OFF | | | B+ | | | |
| II AFTER | | −F | OD | ON | | OFF/ON | | R6b2 | | ON | IN | OFF | R5a1 | | B+ | B+ | | R5c1b R6b5 |
| III BEFORE | − | | OD | ON | | ON | | | | ON | IN | OFF | | | | B+ | | |
| III AFTER | | | OD | ON | | ON | | | | ON | IN | OFF | | | | B+ | | |
| IV BEFORE | − | | OD | ON | | ON | | | | ON | IN | OFF | | | | B+ | | |
| IV AFTER | | (−C) | OD | ON | | ON | | R6b2 NO EFF. | ON | | OUT | OFF/ON | | R6b3 R5a1 | | B+ | R5c1b | |
| IVa BEFORE | + | | OD | ON | | ON | | | ON | | OUT | ON | | | | | | |
| IVa AFTER | | | OD | ON | | ON | | | ON | | OUT | ON | | | | | | |
| IVb BEFORE | + | | OD | ON | | ON | | | ON | | OUT | ON | | | | | | |
| IVb AFTER | | (+C) | OD | ON | | ON | R6b1 | | | ON | IN | ON/OFF | | R6a2 R5a2 | | | R6b5 | |
| V BEFORE | + | | OD | ON | | ON | | | | ON | IN | OFF | | | | B+ | | |
| V AFTER | | | OD | ON | | ON | | | | ON | IN | OFF | | | | B+ | | |
| VI BEFORE | + | | OD | ON | | ON | | | | ON | IN | OFF | | | | B+ | | |
| VI AFTER | | +F | REAL | | ON | ON/OFF | | R6b1 | | ON | IN | OFF | R5b2 | | B+ | B+ | | R6b5 R5c1a |
| VII BEFORE | + | | REAL | | ON | OFF | | | | ON | IN | OFF | | | B+ | | | |
| VII AFTER | | | REAL | | ON | OFF | | | | ON | IN | OFF | | | B+ | | | |
| VIII BEFORE | + | | REAL | | ON | OFF | | | | ON | IN | OFF | | | B+ | | | |
| VIII AFTER | | (+C) | REAL | | ON | OFF | | R6b1 NO EFF. | ON | | OUT | OFF/ON | | R6b4 R5b2 | B+ | | R5c1a | |
| VIIIa BEFORE | − | | REAL | | ON | OFF | | | ON | | OUT | ON | | | | | | |
| VIIIa AFTER | | | REAL | | ON | OFF | | | ON | | OUT | ON | | | | | | |
| VIIIb BEFORE | − | | REAL | | ON | OFF | | | ON | | OUT | ON | | | | | | |
| VIIIb AFTER | | (−C) | REAL | | ON | OFF | R6b2 | | | ON | IN | ON/OFF | | R6a1 R5b1 | | | R6b5 | |

INVENTOR
CEBERN B. TRIMBLE
BY
HIS ATTORNEYS

United States Patent Office 2,919,855
Patented Jan. 5, 1960

2,919,855
REVERSIBLE ELECTRONIC ACCUMULATORS

Cebern B. Trimble, Dayton, Ohio, assignor to The National Cash Register Company, Dayton, Ohio, a corporation of Maryland Application April 13, 1956, Serial No. 578,046

23 Claims. (Cl. 235—173)

The present invention relates to an electronic accumulator and particularly to an accumulator capable of performing addition and subtraction while automatically entering the "fugitive one" correction when required. Each denominational order of the accumulator includes a plurality of multi-electrode tubes arranged in ring fashion. Novel interconnections are provided for the tubes of each order to permit operation thereof in ascending or descending sequences, thereby enabling addition or subtraction to be performed.

Each denominational order is connected to the next higher order by way of a transfer means, so that an additive or subtractive carry is introduced into the latter order when the capacity of the former is exceeded in addition or subtraction, respectively. Also, suitable novel control means is provided for enabling a transfer from the highest denominational order into the lowest order in the form of a corrective "fugitive one" only when the sign of the total in the accumulator is changed. The control means also inhibits any such "corrective" entry when the capacity of the accumulator is exceeded or reentered.

The former type of supervision insures that the accumulator contains the correct amount when operated within its capacity, whether the total be positive or negative. The latter control permits the capacity of the accumulator to be exceeded, within limits, and reentered without error.

Suitable indicating means is provided to display the correct total at all times, negative and positive totals being properly indicated according to the accumulator content. A memory device is included in the "fugitive one" control means. It is "bistable" and assumes one condition of operation for positive balances and its other condition of operation for negative balances. The memory device is switched from one condition to the other in accordance with the "fugitive one" signals. The switching occurs only when the sign of the total in the accumulator changes. Accordingly, the memory device controls the indicating means at all times to insure that the correct total, as to both sign and magnitude, will be indicated.

Objects of the invention are the provision of an electronic accumulator capable of performing successive additions or subtractions, or such operations interspersed at random; the provision of controls for such an accumulator which automatically enter the "fugitive one" correction only when it is required; the provision of an electronic accumulator including an indicating arrangement operating in conjunction with the "fugitive one" control to display the correct total in the accumulator at all times, whether the total is positive or negative; the provision of such an accumulator utilizing the same circuits for performing addition and subtraction; and the provision of controls operable from an accumulator for permitting the capacity to be exceeded and reentered without error.

The invention will be further described with reference to the drawings, which illustrate a preferred embodiment of the invention.

Of the drawings,

Fig. 1 is a simplified block illustration of an accumulator and "fugitive one" controls.

Fig. 2 shows how the sheets of drawings labeled "Figs. 2A–2F" are to be assembled.

Figs. 2A–2F show, in combination, a detailed electrical circuit in accordance with the present invention.

Fig. 3 is a modified showing of circuitry for handling problems involving calculations beyond the normal capacity.

Fig. 4 is a tabulation of components and their conditions of operation in connection with the introduction of positive and negative entries of various amounts.

GENERAL DESCRIPTION

Figure 2A:
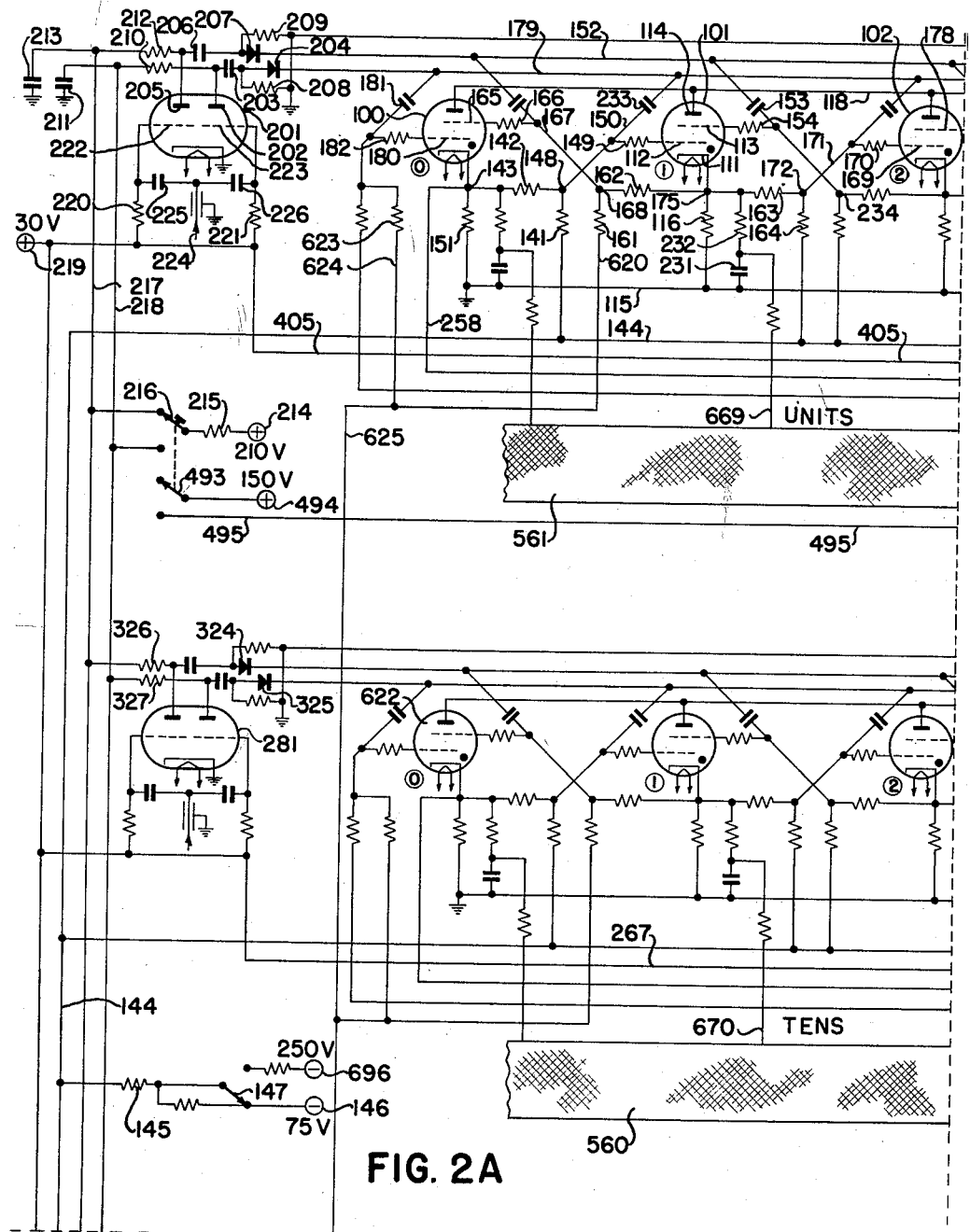

When addition and subtraction are performed in random sequence by an algebraic accumulator, several types of problems may arise. Representative computations exhausting these types are classifiable in twelve categories. A series of additions and subtractions, typical of examples from each of the categories, will be used as a sequence of operations to be performed by the device of the present invention, in order to illustrate the provisions for handling special conditions which arise when the sign of the total in the accumulator is changed or the capacity of the accumulator is exceeded.

The explanation of such a sequence of computations will be facilitated by reference to the block diagram of Fig. 1, which omits the indicating arrangement but shows certain of the control means therefor. Throughout the examples to be presented and the ensuing description, the computations will be based on the decimal system, it being understood that the principles of the invention are equally applicable to the duodecimal and other systems. Therefore, reference to a denominational order or counting bank is intended to be inclusive of numeric systems to the base 10, 12, etc. Also, the showing of only three denominational orders is by way of illustration and not by way of limitation, as obviously the capacity of the accumulator may be extended by adding appropriate denominational orders in accordance with the principles taught herein.

If the decimal system is used, each of the denominational orders includes ten gaseous discharge tubes, labeled from 0 through 9, as indicated in the units order 11 in Fig. 1. The short arrows, appearing above and below the digits, indicate, respectively, the progression of tube operation when additions and subtractions are to be performed. If the tube represented by the numeral "3" is operative, then the "4" tube is primed for operation in the add direction, and the "2" tube is primed for operation in the subtract direction, as will be explained in detail in the description of the circuit of Fig. 2. Also, the "9" tube (Fig. 1), when operative, primes the "0" tube, as illustrated by the line 12, as well as the "8" tube. Sequential operation of the "9" and "0" tubes in an adding operation causes a carry to be applied to the positive carry side 13 of a transfer control means by way of line 14. Likewise, the "0" tube, when operative, primes the "9" tube by way of line 15, as well as the "1" tube, so that sequential operation of the "0" and "9" tubes (in subtraction) causes a carry to be applied to the negative carry side 16 of the transfer control means by way of line 17.

Positive carry effecting means 18 is included between the positive carry side of the transfer control means and the "tens" denominational order 19 for effecting the entry of a positive carry by shifting the operative condition by one tube in the additive direction. Similarly, a negative carry effecting means 20 is connected between the negative carry side of the transfer control means and the "tens" order for shifting the operative condition by one tube in the subtractive direction to effect the entry of a negative carry.

The transfer control means and the transfer effecting means constitute transfer means of the type used between all adjacent orders, the highest order, herein illustrated as the "hundreds" bank 21, also being capable of applying carries to the positive and negative sides of the transfer control means 22 and 23, respectively. In this instance, the positive and negative carry effecting means 24 and 25, respectively, apply "carries" to the units order in the form of positive and negative signals. Of the carry signals, only the "fugitive one" signals, which are developed when the sign of the total in the accumulator is changed, are effective at the carry effecting means 24 and 25, as will be explained. The positive or additive "fugitive one" signals are redeveloped in a flip-flop circuit 31, in accordance with positive or additive carries produced by the "hundreds" order. The positive "fugitive one" signals are applied to the units order positive transfer effecting means 24 by way of a line 33, and the negative "fugitive one" signals are applied to the negative transfer effecting means 25 by way of a line 34.

A memory device 35, which may comprise a bistable trigger pair, cooperates with the "fugitive one" transfer control means 22 and 23, to determine when the entry of a "fugitive one" will be made into the units order 11 by controlling the carry effecting means 24 and 25. For proper results, "fugitive ones" are required to be entered into the units order 11 only when the sign of the total in the accumulator changes. Hence, even though a carry requirement may be indicated by the "hundreds order" 21, the carry may not qualify as a "fugitive one," and entry of the correspondingly developed signal is inhibited at the transfer effecting means 24 and 25 by the memory device 35, unless the sign of the total is changed by the computation developing the signal.

This control is possible because the memory device is changed from one stable condition of operation to the other stable condition of operation during the computations which develop "fugitive one" signals—i.e., when the sign of the total changes—and remains in that condition until the next computation in which the sign of the total changes. "Fugitive ones" will be entered only in those operations in which the memory device changes status, but in all other operations the entries will be inhibited. Hence, a subtractive "fugitive one" will be entered when the sign of the total in the accumulator is changed from plus to minus, and an additive "fugitive one" will be entered when the sign of the total is changed from minus to plus.

*Examples of normal computations*

The foregoing will be clarified and augmented by a step-by-step following of a sequence of algebraic computations. A total of twelve cases will be presented to illustrate all conceivable types of computations involving the accumulator operation in addition and subtraction. The first eight cases involve problems which successively decrease the accumulator capacity total from a positive amount into overdraft and then to an exceed capacity condition in the negative direction. A new negative balance within the accumulator capacity is then assumed, and additive amounts are introduced to cause the total to become less negative, then positive, and finally to exceed the capacity in the positive direction. The remaining four cases are computations made beyond the accumulator capacity and computations which involve reentering the capacity from positive and negative directions.

The block representation of Fig. 1 does not include components for handling the above-mentioned four cases. However, the purpose of the Fig. 3 showing is to illustrate the ease of incorporating "exceed" circuitry with the "fugitive one" control mechanisms. Accordingly, these four cases will be used to facilitate the description of the structure of Fig. 3.

Considering now Fig. 1, the normal types of computation, identified by Roman numerals as to cases, will be used to illustrate the operation of the accumulator and the controls. The explanation will start between computations which might constitute a sequence of entries, for example, in the nature of a bookkeeping problem. If the accumulator contains, for example, the positive number 555, the "5" tubes of each order will be conducting. If it is desired to make a subtractive entry of 333, three pulses are applied to each of the lines 36, 37, and 38 to cause the tubes in each of the orders 11, 19, and 21 to run in a subtractive direction, thereby shifting conduction to the "2" tubes of each order. The input selective means 39, 40, and 41 insure that the pulses are applied in a subtractive manner. This computation involves no carries or "fugitive ones" and is labeled "Case I," being the simplest type of computation.

Case I is illustrated as follows:

| Indicated | Conducting Tubes |
|---|---|
| +555 old total. | 555 before entry. |
| −333 entry. | −333 entry. |
| +222 new total. | 222 after entry. |

The new total in the accumulator is +222, and the "2" tube of each order is now in the conducting condition. In all cases involving a positive total, the numbered tubes of the denominational orders which are conducting represent, respectively, the numbers in the answer. However, this is not true when the total becomes negative, as is presented in the following case example.

In Case II, a negative balance, indicative of an overdraft condition, will be established as illustrated below:

| Indicated | Tubes |
|---|---|
| +222 | 222 |
| −444 | −444 |
| −222 | 777 |

The balance or total remaining in the accumulator from Case I is the +222 appearing at the top of the "Indicated" column. A negative entry of 444 is made, reducing the balance to a negative 222.

The "2" tubes of each of the orders 11, 19, and 21 were conducting at the beginning of Case II, this condition having been established by Case I. When the denominational orders are run backward or in the subtract direction four counts from the "2" tubes, the "8" tubes will be caused to assume the conducting condition. Since each order is caused to pass through zero in the reverse direction, negative or subtractive carries are developed. From the "units" order 11, a subtractive carry is applied through the negative carry side 16 of the transfer control means and the negative carry effecting means 20 to the "tens" order to reduce the count stored in this order from 8 to 7. Likewise, a negative carry developed in the "tens" order 19 is transferred into the "hundreds" order 21, also reducing the count in this order from 8 to 7.

A pulse in accordance with a subtractive "fugitive one" is developed in the "hundreds" order 21 and is effective at the negative transfer control means 23, temporarily to change the status of the flip-flop circuit 32, which applies a delayed pulse to the "fugitive one" transfer effecting means 25 to cause the "units" order setting to be reduced from 2 to 1. The introduction to each order of four counts effective in the subtractive direction thus establishes, in conjunction with the "fugitive one" entry, conduction in the "7" tube of the units order, and, by use of transfers, conduction in the "7" tube of each of the higher orders. This is the condition of the tubes at the conclusion of Case II.

In this subtraction, the correct answer is —222, the tube setting of 777 is the nine's complement of the answer, and the sign of the total has changed from plus to minus. The indicating arrangement, represented by the box 42 and to be described in detail hereinafter, indicates the tube setting for positive totals and the nine's complement thereof for negative totals, its switch-over being under the control of the memory device 35. The memory device cooperates with the "fugitive one" flip-flop circuits 31 and 32 under the control of its memory and the highest order transfer control means 22 and 23 to enter a "fugitive one" by way of the transfer effecting means 24 and 25 only when the sign of the total changes.

The memory circuit selectively applies operating potential to the transfer effecting means 24 and 25, the transfer effecting means 25 being rendered receptive to "fugitive one" signals of the subtractive type when section "B" of the memory is controlling and only when the sign of the total changes from plus to minus. The transfer effecting means 24 is rendered receptive to "fugitive one" signals of the additive kind when section "A" of the memory is controlling and only when the sign of the total changes from minus to plus. Since the entry of carry signals developed in the highest order is inhibited at all other times, the total is correct even when the capacity of the accumulator is exceeded (except, of course, for the order beyond the capacity) because the carry developed when the capacity of the accumulator is exceeded is also inhibited. The purpose of the circuitry of Fig. 3 is to permit subsequent entries to be made which reduce the total to a correct value within the capacity.

In the instant case, the "B" section of the memory device was operative and the "A" section inoperative because the total at the start of Case II was positive. The "B" section was also controlling in Case I because the accumulator content was +555, which amount incidentally may have been preset into the accumulator or may have been there by virtue of a continued transaction. The fact that it is a positive amount determined the condition of the memory device 35, whether the entry resulted from presetting or from a prior transaction. Hence operating potential was available at the transfer effecting means 25, so that the subtractive "fugitive one," when developed, was applied to the "units" order.

The carry signal, developed when the capacity of the "hundreds" order 21 is exceeded, is also effective to cause the memory device 35 to shift to its other condition of operation, with section "A" becoming effective to establish operating potential for the additive "fugitive one" transfer effecting means 24 via line 48. At the same time, section "B" becomes ineffective to maintain operating potential over line 49 for the subtractive "fugitive one" transfer effecting means 25. The switch-over is caused by a signal from the negative transfer control means 23 applied to the "B" section via line 50. The memory device controls are sufficiently slow acting to permit the entry of the "fugitive one" in accordance with the carry which causes the switch-over. Hence in Case II the subtractive "fugitive one" is entered before the operating potential for the negative transfer effecting means 25 is relieved. The entry of subtractive "fugitive ones" will thereafter be inhibited until the memory device is switched back.

Case III involves a further subtraction, which increases the total negatively but to a value still within the accumulator capacity, as indicated below:

| Indicated | Tubes |
|---|---|
| —222 | 777 |
| —666 | —666 |
| —888 | 111 |

The subtraction of 666 from a negative accumulator total of 222 yields a new total of —888, which is the indicated answer. At the beginning of Case III, the "7" tubes of each order were in the conducting condition. Since each counting order is run in the reverse direction for six counts, the "1" tubes of each order are rendered conducting, and there is no problem of exceeding the capacity of any of the orders in either direction. The accumulator content is represented by conduction in the "1" tubes in each order, and the indicated value of —888 is the nine's complement of 111.

The next case illustrates the operation when the capacity of the accumulator is exceeded in the negative direction. It will be recalled that the "A" section of the memory device 35 is operative, as was established by Case II, because the computation involved in Case III did not affect either the carry or the memory circuits. In Case IV, the negative accumulator total of 888 is reduced by 333, so that the true answer is —1221, a value in excess of the exemplary accumulator capacity of 999. The problem is presented as follows:

| Indicated | Tubes |
|---|---|
| —888 | 111 |
| —333 | —333 |
| —(1)221 | 778 |

Considering first the highest denominational order 21 within the accumulator capacity, the "1" tube is conducting before the Case IV entry, and the "one hundred" order 21 is run backward (in descending order) three counts to establish conduction in the "8" tube. As conduction is shifted from the "0" tube to the "9" tube, a subtractive carry signal is developed at transfer control means 23, which signal changes the condition of the flip-flop circuit 32 and also serves as a negative pulse to the "B" section of the memory device 35. The "B" section is already inoperative, so the condition of the memory device is unaffected. However, since the "B" section must be operative for operating potential to be applied to the subtractive "fugitive one" transfer effecting means 25 by way of line 49, this means is also inoperative, and the subtractive "fugitive one" signal from flip-flop 32 is not entered into the "units" order 11. Accordingly, the three input pulses applied to the "units order" determine its new setting, with conduction being shifted to the "8" tube, as is listed in the units column under the heading "Tubes."

When the "units" order is operated from "0" to "9" by the negative three counts, a subtractive carry developed at the negative transfer control means 16 is applied by the transfer effecting means 20 to the "tens" order 19 to establish, in conjunction with the three subtractive counts introduced at the input line 37, conduction in the "7" tube of this order. Also, the substractive carry developed when the "tens" order is run backward is effective to shift conduction from the "8" tube to the "7" tube in the "hundreds" order, so that the tube setting becomes 778. This number is the 9's complement of 221, which is indicated as a negative value because of the overdraft condition.

The true answer is, of course, —1221, the "thousands" digit of which is beyond the capacity of the exemplary accumulator and its indicator. However, the entry of a carry into the "units" order was inhibited, so that the last three digits (221) of the answer is correct. If the transaction is continued in such a way that the next total is within the accumulator capacity, it will be correct and so indicated only if the circuitry of Fig. 3 is used.

Since the "exceed" feature is not included in the structure of Fig. 1, a new negative balance which is within the capacity of the accumulator will be assumed, and a sequence of transactions progressing in the positive direction will be used to explain the further operations. In Case V, the old balance will be taken as —888, and a positive amount of 333 will be introduced to establish a new total of —555 and a new tube setting of 444. This is illustrated as follow:

| Indicated | Tubes |
|---|---|
| —888 | 111 |
| +333 | +333 |
| —555 | 444 |

In each of the orders, conduction is shifted from the "1" tubes to the "4" tubes by the application of an additive three counts. No carry or "fugitive one" signals are developed, and the balance or total in the accumulator is not changed from its overdraft condition.

In Case VI, the negative total in the accumulator will be changed to a positive total, which requires an additive "fugitive one" correction. A positive amount of 777 is added to the negative total of 555 in the accumulator to provide a new positive total of 222. The tube settings of 444 are changed to 222, the same as the answer, because of the established real or positive balance. This problem is set forth as follows:

| Indicated | Tubes |
|---|---|
| —555 | 444 |
| +777 | +777 |
| +222 | 222 |

Considering first the highest order bank 21, the application of seven counts to the "hundred" ring causes conduction to be shifted from the "4" tube to the "1" tube, which develops a carry signal of the "fugitive one" type, since the capacity of the "hundreds" order is exceeded. This is an additive "fugitive one" correction, since the capacity is exceeded in a positive manner, and, accordingly, a correction signal appears at the positive transfer control means 22. Since the memory device 35 is operating on the "A" section, operating potential is applied to the additive transfer effecting means 24 to enter the additive "fugitive one" correction signal from the delay-producing flip-flop 31 into the units order by way of line 33.

This entry increases the "units" tube setting to "2" from the "1" setting established by the application of the positive 7 counts to the "units" order. Due to the original entry, the capacity of the "units" order was exceeded in a positive direction. This action provided an additive carry, which was entered into the "tens" order by way of the transfer control means 13 and the transfer effecting means 18. The "tens" setting was therefore changed from the "4" tube to the "2" tube by the application of the positive 7 counts in conjunction with the additive carry. The capacity of the "tens" unit was also exceeded in a positive direction, so that an additive carry was applied to the "hundreds" order, which caused the "hundreds" tube setting to become "2."

The additive "fugitive one" signal developed when the capacity of the "hundreds" order 21 was exceeded was also applied to the "A" section of the memory device 35 (from transfer control means 22) by way of lead 51. Although this "fugitive one" signal is of the additive kind, it is in reality a negative pulse, which causes the memory device to shift over to its "B" section of operation. The shifting of the condition of a component controlled by the memory device is sufficiently slow to permit the entry of the "fugitive one" signal into the "units" order by way of transfer effecting means 24 before the operating potential for the latter means is relieved. Hence it may be appreciated that the sign of the total in the accumulator has changed from minus to plus and an additive "fugitive one" signal has been effective as a corrective entry to provide the correct answer. Also, the memory device has been switched over to its other operative condition for the handling of subsequent case problems.

The next case—namely, Case VII—is provided to show the operation of adding a positive number to a positive total already in the accumulator. An amount of 444 will be combined with the positive total of 222 to provide an answer of +666 as follows:

| Indicated | Tubes |
|---|---|
| +222 | 222 |
| +444 | +444 |
| +666 | 666 |

This problem is straightforward, in that the addition involves no carries or "fugitive one" signals. The tube settings are merely changed from the "2" tubes to the "6" tubes by the application of four positive counts to each denominational order.

Case VIII extends the transaction in the additive direction to an amount in excess of the accumulator capacity. In this case, the accumulator total is +666, to which will be added +555, yielding a true total of +1221. Since the highest order, herein illustrated by way of example, is the "hundreds" order, the "thousands" digit will not be indicated. However, the portion of the answer within the capacity will be correct and so indicated, as shown in the following algebraic notation:

| Indicated | Tubes |
|---|---|
| +555 | 666 |
| +555 | +555 |
| +(1)221 | 221 |

The capacity of each of the orders is exceeded, since the addition of five and six in each column exceeds ten. Accordingly, additive carries are effective between the "units" and "tens" orders and the "tens" and "hundreds" orders. However, since the memory device 35 is in condition "B," no operating potential is available for the positive transfer effecting means 24, and consequently the additive carry signal from the "hundreds" order 21 is inhibited, thereby permitting a correct answer as to the indicated digits to this case problem.

The foregoing eight cases represent typical operations in routine transactions. All normally encountered algebraic computations fall within the above-outlined categories, the bulk of the computations being operations of addition or subtraction which fall within the capacity of the accumulator. However, it is quite possible, in working with a long train or series of numbers involving algebraic computations, for the operator to unwittingly cause the capacity of the particular machine employed to be exceeded.

A feature of the present invention permits the operator to exceed the capacity of the machine at any time during a transaction and then return within the capacity immediately, or after performing further computations, without fear of error. This is particularly advantageous in computing bank balances and the like, where additions and subtractions are intermittently dispersed and where the end result or total is within the machine capacity. However, a further indicator device is provided, which is operated whenever the capacity of the accumulator is exceeded in either direction. Hence, if the final balance is an amount in excess of the accumulator capacity, the operator is aware of this condition.

Examples of unusual computations

The following four cases will be concerned with computations wherein the capacity of the accumulator has been exceeded in the positive and negative directions and succeeding computations advance the total toward the accumulator capacity and, ultimately, within the capacity.

In Case IV, set forth above, the capacity of the accumulator was exceeded in the negative direction. Cases IVa and IVb involve computations which, respectively, reduce the total so that it approaches the capacity, and, further, reduce the new excessive total to a value within the capacity. When the capacity of the highest order was exceeded in a subtractive operation, a subtractive carry signal was developed, which, in Case IV, was inhibited because section "A" of the memory device was controlling. However, the operation of reentering the accumulator capacity also develops a carry signal, which is additive in kind because an additive entry is required for the return. Since section "A" of the memory device is still controlling, this signal would ordinarily be erroneously entered into the "units" order.

The modification represented in Fig. 3 inhibits the entry of this additive carry signal to assure a correct accumulator content upon reentry. Also, computations performed in the order immediately beyond the accumulator capacity, which involve no carry signals out of the highest accumulator order, are automatically taken care of in the manner of normal operation. An example of the latter type of computation is illustrated by Case IVa as follows:

| Indicated | Tubes |
|---|---|
| −(1)221<br>+111 | 778<br>+111 |
| −(1)110 | 889 |

The negative total of (1)221 from Case IV is reduced toward the accumulator capacity by the positive amount of 111, the new total being −(1)110, a value still beyond the accumulator capacity. The tube settings of 778 are shifted to a new setting of 889 by the positive amount of 111. Thus neither "fugitive one" signals nor carry signals are developed in this representative computation, so this case is handled in the manner of a normal operation and requires no further description.

The operation of returning to a new total within the accumulator capacity is depicted in Case IVb as follows:

| Indicated | Tubes |
|---|---|
| −(1)110<br>+222 | 889<br>+222 |
| −888 | 111 |

The total from Case IVa of −(1)110 is further reduced by an additive entry of 222 to provide a correct indicated accumulator total of −888. The tube setting of 889 is shifted to a new setting of 111, each of the orders passing at least from 9 through 0 to provide carries out of the "units," "tens," and "hundreds" orders. The carries from the first two orders are effective as always to establish the tube setting indicated, but the carry from the highest order is inhibited in entry to the "units" order to provide the correct 9's complement tube setting.

In Fig. 3, a further or auxiliary memory device 61, similar in construction to the trigger pair arrangement of memory device 35, cooperates therewith in inhibiting the entry of "fugitive ones" into the positive and negative sides 24 and 25, respectively, of the "units" correction or transfer effecting means for the "units" orders upon the return to capacity. The memory device 61 is also capable of two conditions of operation. Normal operation is the "N" condition, and operation when the capacity of the accumulator is exceeded is the "E" condition.

The memory device 35 and the units corrections means 24 and 25, along with the circuitry for applying operating potential thereto, are included among the components depicted in Fig. 1. The additional circuitry of Fig. 3 is provided to inhibit the carry signals which are developed when the accumulator capacity is reentered; to operate an exceed signal for the benefit of the operator; and to preserve the condition of operation of the main memory device 35 when the capacity is exceeded.

In Fig. 3, a pair of switches having contact arms or blades 62 and 63 ganged together is provided as an auxiliary function switch, which is set in the "subtract" position (as is indicated) for subtractive operations and in the "add" position for additive entries. An input connection or lead 64 is provided for additive carry signals, including additive "fugitive one" signals, to the switch blade 62, and a similar input connection or lead 65 provides a path for subtractive carry signals, including subtractive "fugitive one" signals, to the contact arm or blade 63 of the function switch.

The lead 64 of Fig. 3 may be connected to the point 52 of Fig. 1, so that carry signals of the additive kind from transfer control means 22 may be applied to the switch contact arm 62 and also to section "A" of the memory device 35 by way of lead 51′ (Fig. 3), corresponding to lead 51 of Fig. 1. This signal path permits the "fugitive one" signal of the additive kind access to the memory device to switch it from operation in the "A" section to operation in the "B" section. Similarly, the subtractive carry signal path 65 may be connected to the point 53 of the Fig. 1 drawing to permit carry signals to pass to the contact arm 63 of the function switch and also by way of lead 50′ (corresponding to the lead 50 of Fig. 1) to the "B" section of the memory device 35 for switching operation to the "A" section when the subtractive carry is of the "fugitive one" type.

The operation of the circuit of Fig. 3 can best be described using case examples. In Case IV, supra, the negative entry of 333, when algebraically combined with the old negative balance of 888, caused the capacity of the accumulator to be exceeded in the negative direction, which resulted in the development of a subtractive "fugitive one" signal. This signal was inhibited in entry with respect to the "units" order because the memory device 35 was operating in condition "A." The function switch including contact arms 62 and 63 is in the subtract position because Case IV involves a subtractive entry, which occasions the exceeded capacity condition. Accordingly, contact arm 63 (in the position shown) completes a circuit to lead 66 which extends to a normally closed contact R6b3 of the relay R6 illustrated in phantom outline above the Exceed side of the auxiliary memory 61, the relay R6 in reality forming a portion of the circuit depicted in this block. In the identification R6b3, the b represents a normally closed set of contacts which open when relay R6 is energized—i.e., the memory device 61 is operating in its "E" condition—and the digit 3 indicates the third set of such contacts, which are operated by relay R6.

At the beginning of the computation involved in Case IV, the capacity of the accumulator had not been exceeded, and the memory device 61 is therefore operating in its "N," or normal, condition of operation, so that the R6b3 contacts are closed and the subtractive carry signal path is extended via lead 67 to a set of contacts R5a1 operated by the relay R5, shown in phantom outline above the section "A" of the memory device 35. The "a" designation indicates that this set of contacts is normally open and closes upon energization of the relay coil R5. The memory device 35 is operating in condition "A" (the old balance of −888 being in overdraft), so contacts R5a1 are closed to provide a circuit for the negative pulse 71, indicative of the subtractive "fugitive one" carry signal, by way of lead 68 to the auxiliary memory device 61. This pulse switches the memory device 61 from its Normal condition to its Exceed condition, so that section "E" becomes controlling. The upper set of contacts R6a3 of relay R6 are then closed in condition "E" to provide a path from the positive terminal 69 to the Exceed capacity signal device 70, which notifies the operator by buzzer or light indication that the accumulator capacity has been exceeded.

In reality, the operator need not heed this signal, because the transaction may be continued until the ultimate answer is within the accumulator capacity. Therefore, the signal becomes of particular significance only when a transaction involving a series of computations yields a final answer which is outside the capacity of the accumulator. The indicated portion of the answer is, of course, correct, and the operator need only supply the missing digit. For example, if the computation were concluded in Case IV, the indicated portion of the total would be a negative 221, and the operator, noting the exceed signal, would supply the thousands digit to yield a correct answer of −1221. This could, of course, be verified by making an additive entry of +1000 and checking the indicator for a new answer of −221.

The exceed signal will continue to function as long as the capacity of the accumulator remains exceeded, which is the situation in Case IVa, also supra, the subtractive "fugitive one" signal (from Case IV) having established the exceed indication. However, Case IVb involves a computation which yields an answer within the accumulator capacity, the Case IVa balance of −1110 being reduced to a new total of −888 by the additive entry of 222. At the beginning of Case IVb, the memory device 35 is still operating in its condition "A" (the balance of Case IVa being in overdraft, beyond capacity), and the function switch including contact arms 62 and 63 is set in the add position because an additive entry of 222 is to be made.

The additive carry signal is applied to line 81 by way of contact arm 62 of the function switch. Relay contacts R6a2 are closed because the auxiliary memory device 61 is in the "E" condition, and also relay contacts R5a2 are closed because the memory device 35 is in the "A" condition, so that the negative signal 83, illustrated at the input lead 64 and corresponding to the additive carry signal, passes through the first set of these contacts, along lead 82, through the second set of contacts to the Exceed section of the auxiliary memory 61 by way of conductor 84. The application of this negative signal shifts the condition of operation of the auxiliary memory device 61 back to its Normal condition, so that contacts R6a3 open to relieve energization of the Exceed signal 70.

The additive carry signal developed in Case IVb is also prevented from affecting the memory device 35 by contacts R6b1 in lead 51', which are opened only when the auxiliary memory device 61 is in the "E" condition of operation. Hence the memory device 35 remains in operating condition "A" to enable the "fugitive one" signal inhibiting operation in accordance with the description heretofore presented; i.e., until the accumulator balance or total becomes positive.

The contacts R6a1 are closed when the auxiliary memory device 61 is shifted back to its Normal operating condition, so that switching of the memory device 35 is again under the control of the "fugitive one" signals. Since the memory device 35 is operating under condition "A," the positive or additive carry signal from Case IVb would normally be effective over lead 87 to cause the "units" correction means 24 to enter a count into the "units" order.

However, certain contacts under the control of the auxiliary memory 61 insure that such an entry is not made, as will now be explained. The sets of contacts R5c1b and R5c1a are provided in the B+ supply line 88 from positive source 69 to control the application of operating potential to the "units" correction devices 24 and 25. These contacts, being of the c variety, provide operating potential to the positive side 24 of the units correction device by way of lead 48' when the memory device 35 is in condition "A" and operating potential to the negative side 25 of the units correction device when the memory device is operating in its condition "B." However, a set of relay contacts R6b5 is also provided in the lead 88 between the relay contacts R5c1b—R5c1a and the positive source 69 to open this circuit whenever the accumulator capacity is exceeded; i.e., the auxiliary memory device 61 is in its condition "E." Accordingly, even though an additive carry signal is available at lead 87 for the positive "units" correction device 24, the relay contacts R6b5 are open, so that operating potential is not applied to the "units" correction device.

It may now be appreciated that the additive carry signal developed upon a re-entering of the accumulator capacity from the negative direction is inhibited in entry to the units correction 24, but the memory device 35 remains in its condition "A" of operation, so that subsequent computation will not be impaired. Also, the Exceed signal is appropriately displayed or utilized and is automatically removed when the capacity is re-entered. Furthermore, the circuit of Fig. 3 permits computations beyond the capacity to be handled automatically without intervention by the operator.

A similar situation arises in connection with Cases VIII, VIIIa, and VIIIb, where the capacity of the accumulator is exceeded in the positive direction and subsequently re-entered. In Case VIII, an additive carry signal was developed when an additive entry of 555 was combined with the old balance of +666 to yield a new excessive total of +1221. Since the function performed in case VIII was one of addition and an additive carry signal was developed, a path was established along input conductor 64 and contact arm 62 of the function switch to relay contacts R6b4 by way of conductor 81. These contacts are normally closed, and, since the auxiliary memory device 61 is still operating in its Normal condition (the capacity having been exceeded only so far as the denominational orders are concerned), the additive carry signal is extended via conductor 90 to relay contacts R5b2 of the relay coil R5 which is under control of the main memory device 35. However, this memory device is operating in the "B" condition (because the accumulator balance is real) so the last mentioned relay contacts are closed to provide a path to the auxiliary memory device 61 via conductor 68, the negative pulse in accordance with this additive carry signal shifting the condition of operation of the auxiliary memory 61 to the Exceed side. It is this operation which insures that relay contacts R6a3 will be closed to signify the Exceed condition during Case VIIIa.

Case VIIIa is similar to Case IVa in that no "fugitive one" signals or carries are developed. This computation appears as follows:

| Indicated | Tubes |
| --- | --- |
| +(1)221<br>−111 | 221<br>−111 |
| +(1)110 | 110 |

The positive excessive balance of (1)221 from Case VIII is reduced in the direction of the capacity by the amount 111 to provide a new total of (1)111, which is still beyond the capacity. The tube setting of 221 is shifted to 110 without any transfers or carries being developed because none of the denominational orders is caused to pass from zero to nine, the new setting agreeing with the indicated answer portion because the balance or total is positive. Since in Case VIIIa there are no carry or "fugitive one" signals developed, the only operation of the circuit of Fig. 3 of significance is confined to the relay contacts R6a3, which remain closed, signifying the Exceeded capacity condition. These contacts were closed by the computation of Case VIII when the capacity was first exceeded, but after the auxiliary memory 61 was shifted to its "E" condition.

The last case to be considered is that of returning within capacity from the positive direction namely, Case VIIIb. The case is presented as follows:

| Indicated | Tubes |
|---|---|
| +(1)110<br>−222 | 110<br>−222 |
| +888 | 888 |

The total of +(1)110 is reduced by the amount of 222 to a positive total of 888 which is well within the accumulator capacity. The introduction of two subtractive counts into each order of the accumulator causes the conducting condition of the tubes to be changed to tubes 888, a transfer or negative carry signal being developed by the respective orders. The carry from the "units" order to the "tens" order is effective, as is the carry from the "tens" order to the "hundreds" order, but the subtractive carry signal out of the highest order is inhibited, so that the new accumulator total is correct. Since this is an operation of subtraction, the function switch including contact arm 63 is in the position indicated in Fig. 3.

A pathway is formed for the subtractive carry signal introduced at input conductor 65 via contact arm 63 and lead 66 to relay contacts R6a1. These contacts are closed because the auxiliary memory device 61 is operating in its Exceed condition, and the signal thus follows a path via conductor 91 to relay contacts R5b1 of the memory device 35. These contacts are also closed because the main memory device 35 is operating in its "B" condition, so that the negative signal is extended via conductor 84 to the Exceed side of the auxiliary memory device 61 to switch this device to its other, or Normal, condition of operation. Relay contacts R6a3 are thus opened, and the exceed signal is nullified.

Ordinarily the subtractive carry signal developed in Case VIIIb would enter the negative side 25 of the units correction means for application to the "units" order, via conductor 92. However, when the auxiliary memory device 61 is in its Exceed condition, the relay contacts R6b5 are open, so that the operating potential circuit via lead 88 from positive source 69 is interrupted. Also, in this circuit the relay contacts R5c1a are open because the main memory device 35 is operating in condition "B." The subtractive carry signal is also prevented from influencing the main memory device 35 via lead 50' because relay contacts R6b2 are open when the auxiliary memory device 61 is in the Exceed condition. Hence, it may be appreciated that the subtractive carry signal developed when the accumulator capacity is re-entered from a positive direction is inhibited in entry into the "units" order and is without effect upon the condition of the main memory device 35.

DETAILED DESCRIPTION

Accumulator

Figure 2B:
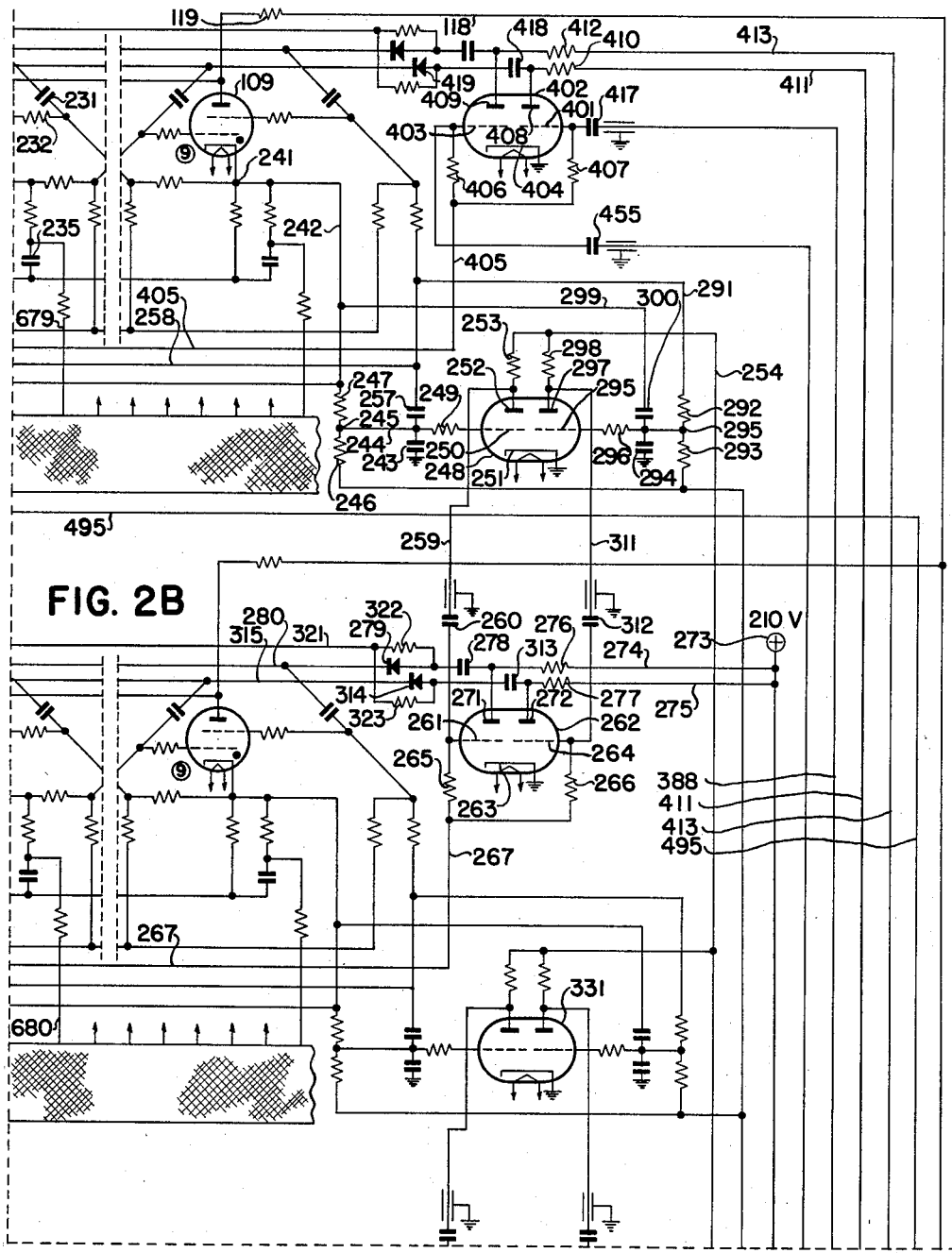

Fig. 2 indicates the arrangement of the individual sheets of the drawing identified as sheets 2A through 2F to form a composite circuit diagram incorporating the features of Figs. 1 and 3 above set forth and adding thereto. The three groups of 10 tubes each form, respectively, the "units," "tens," and "hundreds" orders. However, since the intermediate tubes of the groups are connected in the same manner, the drawing was simplified by omitting the "3" through "8" digit-representing tubes of each order, the units" order (Figs. 2A and 2B) including, therefore, the "0," "1," "2," and "9" tubes, respectively, numbered 100, 101, 102, and 109. Only the "units" order will be described in detail, since the orders are similarly constructed, and an understanding of the operation of one order will provide an understanding of the operation of the other orders.

The digit representing tubes are of the gaseous variety; for example, RCA type 5696, whereof the "1" tube 101 of the "units" order is typical, having a cathode 111, control electrode 112, auxiliary or shield electrode 113, and anode 114. The cathode 111 is connected to a common ground lead 115 over a 15,000 ohm resistor 116. The anode 114 is connected to a positive 105 volt D.C. supply terminal 117 (Fig. 2D) by way of a common anode supply lead 118 including a common load resistor 119 of 3300 ohms and relay contacts R4a2.

A priming circuit for the control electrode 112 consists of a pair of resistors 141 and 142 (Fig. 2A) of one megohm each, forming a voltage divider network between junction point 143 in the cathode circuit of the "0" tube 100 and a bias voltage on lead 144. The bias lead is normally connected through a 10,000 ohm resistor 145 (Fig. 2A) to a negative 75-volt D.C. bias supply terminal 146 by way of a single pole double throw guard switch 147. The control grid 112 is connected to the junction point 148 between voltage divider resistors 141 and 142 by way of a 47,000 ohm grid resistor 149 in lead 150. Normally, the potential at junction point 148 is approximately −37½ volts due to the dividing action of resistors 141 and 142 effective on the 75-volt supply from terminal 146. However, when the "0" tube 100 is conducting, its cathode potential at junction point 143 becomes +75 volts, due to the tube current through its cathode resistor 151, so that the potential of junction point 148 of control electrode 112 shifts to zero or a slightly positive value, thereby establishing a primed condition for this grid.

If the "0" tube 100 of the "units" order is conducting, the rest of the tubes in this order will be non-conducting (due to the common anode resistor 119). The only tube which is primed on its control grid is the "1" digit representing tube 101. The application of a positive pulse from additive pulsing line 152 to the auxiliary electrode 113 of the "1" digit representing tube by way of a 25 micro-microfarad condenser 153 and 47,000 ohm grid resistor 154 causes the "1" tube to conduct to the exclusion of any other tubes of the "units" order. Hence the count would be advanced from "zero" to "one." It is obvious that, even though all of the auxiliary grids of the tubes of the "units" order are connected to the additive pulsing line 152, only the "1" tube will be fired, because it is the only tube which is primed on its control grid.

The "1" digit representing tube also includes a pair of voltage dividing networks in its cathode circuit. The first voltage dividing circuit comprises equal valued one-megohm resistors 161 and 162, and the second voltage divider network includes similar resistors 163 and 164. The auxiliary electrode 165 of the "0" tube is connected through its 47,000 ohm grid resistor 166 and lead 167 to the junction point 168 between the resistors 161 and 162 of the first voltage divider network. Similarly, the control electrode 169 of the "2" tube 102 is connected through its grid resistor 170, of 47,000 ohms, and via lead 171 to the junction point 172 between the resistors 163 and 164 of the second voltage dividing network of the "1" tube 101.

When the "1" tube 101 becomes conducting, its cathode potential at junction point 175 rises to approximately +75 volts, due to the current flow in the cathode resistor 116. By voltage divider action, the potential of junction points 168 and 172 becomes at least zero or slightly positive to prime the "0" tube 100 by way of its auxiliary grid 165 and the "2" tube 102 by way of its control electrode 169. The subsequent application of a positive pulse to the additive pulsing line 152 would establish conduction in the "2" tube 102 by way of its auxiliary electrode 178, because this tube is already primed on its control electrode 169. However, this additive pulse would not alter the non-conducting condition of the "0" tube 100, because its priming is only effective on its auxiliary electrode 165. Hence the "units" order would be caused to step one digit in the positive or additive direction.

However, if, instead of the application of a pulse to the positive or additive pulsing line 152, a positive pulse were applied to the subtractive line 179, the "0" tube 100 would become conducting. This is because the "0" tube is already primed on its auxiliary electrode 165 due to conduction in the "1" tube, and the pulse from the line 179 would be effective on the control grid 180 by way of the 25 micro-microfarad condenser 181 and grid resistor 182.

Therefore, conduction would be shifted from the "1" tube to the "0" tube because all of the anodes of the digit-representing tubes of the "units" order are connected over the common anode resistor 119 to a common B+ supply applied at terminal 117 (Fig. 2D), and the firing of the "0" tube 100 would cause the common anode potential to drop below the sustaining voltage for the previously conducting tube 101.

Addition is therefore performed by shifting conduction from tube to tube in the normal or ascending order, and subtraction is performed by shifting conduction from tube to tube in the reverse or descending order.

The input means (Fig. 2A) for the "units" order comprises the duo-triode tube 201, preferably of the 6J6 type, having its right-hand anode 202 coupled to the subtractive pulsing line 179 by way of a 1,000 micro-microfarad condenser 203 and an isolating rectifier 204 of the 1N34 type. The left hand anode 205 is similarly connected to the additive pulsing line 152 via the 1,000 micro-microfarad condenser 206 and rectifier 207. The rectifiers 204 and 207 are oriented to pass pulses from the input tube 201 to the pulsing lines 179 and 152 but preclude the passage of pulses from these lines through either side of the tube. The coupling condensers 203 and 206 are by-passed to ground by the 470,000 ohm resistors 208 and 209, respectively.

The anode 202 of the input tube 201 is connected through a 27,000 ohm plate load resistor 210 and a 0.25 microfarad condenser 211 to ground and the left hand anode 205 of the same tube is similarly connected through a 27,000 ohm-load resistor 212 and 0.25 microfarad condenser 213 to ground. The D.C. power supply for the tube 201 is indicated at the +210 volt terminal 214. This terminal is connected by way of a 1,000 ohm resistor 215, a push button switch 216 (shown in the additive position), and lead 217 to the junction between the condenser 213 and plate load resistor 212. In the subtract position, switch 216 connects the D.C. source at terminal 214 to the junction between condenser 211 and plate load resistor 210 via lead 218.

When addition is to be performed, the switch 216 is set in the position shown, so that B+ is supplied to the left-hand anode 205 of the tube 201. Of course, subtraction is permitted when the switch 216 is depressed to the "subtract" position, so that B+ is applied to the right-hand anode 202 of the tube 201, the positive pulses indicative of subtractive counts being applied to the subtractive pulsing line at 179. A biasing circuit for the triode sections included in the input tube 201 extends from the +30 volt terminal 219 via one-megohm resistors 220 and 221 to the left-hand control grid 222 and the right hand control grid 223, respectively.

The input pulses supplied by a keyboard-controlled impulse generator or other device are introduced at the shielded pulse line 224, which is capacitively coupled by the 1,000 micro-microfarad condensers 225 and 226 to the control grids 222 and 223, respectively. It should be noted that, when the power switch 216 is in the add position, the left hand side of input tube 201 will be conducting (in the absence of input pulses) because its control electrode 222 is positively biased, and, when the power switch 216 is in the subtract position, the right-hand triode section will be conducting because its control electrode 223 is similarly biased. However, the introduction of negative counting pulses on input lead 224 cuts off the conducting section of the tube 201, once for each negative pulse, to cause a corresponding number of positive pulses to appear on the pulsing line 152 or 179 as determined by the setting of the power switch 216. The condensers 211 and 213, respectively, disposed in the anode circuits of the triode sections of tube 201, provide a slow anode potential rise when conduction is shifted from one section of the tube to the other, so that no sharp potential changes are present to affect the pulsing lines 152 and 179.

Assume now that the "1" digit representing tube 101 is conducting and all other tubes in the "units" order are in a nonconducting condition and it is desired to introduce a single additive count into the "units" order. The switch 216 is set in the additive position (as illustrated), so that B+ is available for the anode 205 of the left-hand triode section of tube 201. This section is then conducting because of its positive grid 222, and the right-hand section is non-conducting because of the absence of anode potential. A negative pulse is applied to the input pulsing line 224 momentarily to cut off the left-hand triode section, causing a positive pulse to pass through coupling condenser 206 and rectifier 207 to the positive pulsing line 152. This pulse is effective at the auxiliary electrode 178 of the "2" digit representing tube 102 by way of condenser 231 and grid resistor 232 to cause this tube to assume the conducting state, priming having already been effected on its control electrode 169 due to the increased potential level at junction point 172 as determined by the conducting condition of the "1" digit representing tube 101.

As the "2" digit representing tube becomes conducting, the common anode potential decreases, due to the increased current flow through common anode resistor 119, so that the anode potential of the "1" digit representing tube 101 decreases. Its cathode potential, however, remains at approximately the +75 volt level, due to the 5,000 micro-microfarad condenser 231, which was charged during the conducting period for the "1" tube and which is now effective through the 2,400 ohm resistor 232 to maintain approximately this cathode potential at junction point 175. Accordingly, the potential across the gas tube 101 becomes insufficient to support conduction, and this tube becomes non-conducting as the "2" digit representing tube 102 becomes conducting to represent the addition of a positive count.

If a count is to be subtracted from the "units" order when the "2" digit representing tube 102 is conducting, the switch 216 is set on the subtract position, so that B+ is applied from terminal 214 to the anode 202 of the right-hand triode section of input tube 201. Then the application of a negative pulse to input pulsing line 224 momentarily cuts off the right-hand section of tube 201 to apply a positive pulse through coupling condenser 203 and rectifier 204 to the subtractive pulsing line 179. This pulse is effective at the control electrode 112 of the "1" digit representing tube by way of coupling capacitor 233 and grid resistor 149 to fire tube 101, since it was already primed on its auxiliary electrode 113 because of the elevated potential level of junction point 234 in the cathode circuit of the "2" digit representing tube 102. Accordingly, the application of the subtractive count establishes conduction in the "1" tube and non-conduction in the "2" tube, due to the latter's sustained cathode potential level as determined by condenser 235 in the manner hereinbefore explained. Hence the "units" order now represents a single count, or the digit one.

The operation of exceeding the capacity of the "units" order to develop a carry or transfer effective at the "tens" order will now be explained, first with respect to an additive carry. The "1" tube 101 of the "units" order was last conducting, and, if an additive count of nine is entered into the "units" order, the total is ten, which is represented by conduction in the "zero" tube 100 with a positive carry or transfer being introduced into the next higher order, herein represented by the "tens" order. The switch 216 is set in the additive position as illustrated. Successive pulses are introduced through the left-hand triode section of input tube 201 to additive pulsing line 152, so that conduction is successively shifted from the "1" to the "2" to the "3" tubes, etc., until all pulses are entered and the "0" tube has assumed the conductive condition.

When the "9" digit representing tube 109 (Fig. 2B) became conductive, its cathode potential at junction point 241 was elevated to approximately +75 volts, and this sudden increase in potential was applied over lead 242 to charge a grounded 50 micro-microfarad condenser 243 connected by lead 244 to the junction point 245 of a pair of one-megohm resistors 246 and 247. The charged condenser 243 primed the left-hand triode section of a transfer control tube 248 by way of a 47,000 ohm grid resistor 249 and its control electrode 250. This tube is preferably of the 6J6 variety, having a grounded cathode 251 and an anode 252 connected by way of a 30,000 ohm load resistor 253 and lead 254 to the 105 volt B+ power supply terminal 117 (Fig. 2D).

The charge contained by condenser 243 was insufficient to raise the grid potential of control grid 250 enough above the potential of the cathode 251 to cause conduction in the left-hand triode section of control transfer tube 248. Consequently, the tube was only primed when the "9" tube 109 was conducting. However, when conduction was subsequently shifted to the "0" digit representing tube 100, a further 50 micro-microfarad condenser 257 (Fig. 2B) was charged by way of lead 258, which connects to the junction point 143 in the cathode circuit of the "0" tube.

The cumulative charge of the condensers 243 and 257 was sufficient to cause conduction in the left-hand triode section of the transfer control tube 248, so that a negative pulse was applied by way of shielded lead 259 and 1,000 micro-microfarad condenser 260 to the left-hand control grid 261 of a normally conducting transfer effecting tube 262.

The cathode 263 of the transfer-effecting tube 262 is grounded, and its control electrodes 261 and 264 are normally maintained positive over the one-megohm grid resistors 265 and 266, connected together, and by common lead 267 to the +30 volt terminal 219 (Fig. 2A). The anodes 271 and 272 are also maintained at a high positive potential by a 210 volt source applied at terminal 273 (Fig. 2B) and effective over leads 274 and 275 including, respectively, 27,000 ohm load resistors 276 and 277. A 1,000 micro-microfarad coupling condenser 278 and a rectifier device 279—for example of the germanium 1N52 type—are connected between the left-hand tube section anode 271 and the additive pulsing line 280 for the "tens" order.

Hence the application of a carry or transfer signal, in the form of a negative pulse from tube 248, to the control grid 261 of the left-hand triode section of the transfer-effecting tube 262 provides a positive pulse to the additive pulsing line 280 (because the latter tube is momentarily cut off). This pulse enters an additive count in the "tens" order, which supplements the count already contained therein and is effective in the same manner as the counts applied from the "tens" order input tube 281 (Fig. 2A) by way of the other end of the additive pulsing line 280.

Subtractive carries or transfers are treated in a like manner to the positive carries or transfers, except that the right-hand triode section of the "units" order transfer control tube 248 is employed in conjunction with the right-hand triode section of the transfer-effecting tube 262 to introduce a subtractive count into the "tens" order. This operation occurs whenever the "units" order is run backward from "zero" to "nine" or its capacity is exceeded in the subtractive direction. When conduction is established in the "zero" digit representing tube 100, its cathode potential (as evidenced at junction point 143) is elevated to approximately +75 volts to provide a charging path over conductor 258, conductor 291, and the voltage divider comprising the one-megohm resistors 292 and 293 to charge the 50 micro-microfarad condenser 294 connected to the junction point 295 between the voltage divider resistors. The condenser 294 is effective in establishing the potential of the right-hand control grid 295 of the transfer control tube 248 by way of the grid resistor 296, of 47,000 ohms. The anode 297 of this tube section is connected over its 30,000 ohm anode resistor 298 and common anode supply lead 254 to the +105 volt terminal 117 (Fig. 2D). The anode supply voltage and the grid potential with only condenser 294 charged (the "0" tube 100 conducting) are such that the tube section will not conduct but is in a primed condition on its control grid 295.

Subsequently, when conduction is shifted to the "9" digit representing tube 109, its cathode potential as evidenced at junction point 241 is elevated to approximately +75 volts to provide a charging potential over conductors 242 and 299 for a 50 micro-microfarad condenser 300. Accordingly, the sudden potential increase experienced at cathode junction point 241 is applied through condenser 300 to elevate the potential of control grid 295 sufficiently to cause conduction in the right-hand triode section of the transfer control tube 248. Hence a negative pulse (due to the drop in anode potential) is applied over shielded lead 311 and through coupling condenser 312, of 1,000 micro-microfarads, to the control grid 264 of the right-hand section of the transfer-effecting tube 262.

The negative pulse causes this normally conducting tube section to become non-conducting, resulting in the application of a positive pulse through the 1,000 micro-microfarad condenser 313 and germanium rectifier 314 to the subtractive pulsing line 315. The introduction of a subtractive count to the subtractive pulsing line 315 shifts conduction (by one count per pulse) in the reverse direction in the "tens" order. For example, if the "2" tube of the "tens" order were conducting prior to the application of the subtractive carry or transfer, conduction would be shifted to the "1" tube, which would then represent the content of the "tens" order.

The coupling condensers 278 and 313 are, respectively, by-passed to common ground lead 321 by the 470,000 ohm resistors 322 and 323. The rectifiers 279 and 314 serve to isolate the tube load resistors 276 and 277 from the additive pulsing line 280 and subtractive pulsing line 315 relative to the source of pulses or input tube 281. Similarly, the rectifiers 324 and 325, connected in the output circuits of the input pulsing tube 281 (Fig. 2A), isolate the add and subtract pulsing lines from the load resistors 326 and 327, which becomes important when the transfer-effecting tube 262 (Fig. 2B) is the source of transfer or carry pulses.

The "tens" order also includes a normally non-conducting transfer control tube 331 (Fig. 2B), identical in arrangement and operation to the "units" transfer control tube 248 above described. This tube controls the operation of a normally conducting "hundreds" order transfer-effecting tube 332 (Fig. 2D) provided for entering carries into the "hundreds" order. A further normally non-conducting transfer control tube 333 (Fig. 2D) develops carries in accordance with the "hundreds" order input, herein representing the highest denominational order.

The controls

These carries are the basis of the "fugitive one" signals which are delayed in the flip-flops 31 and 32 (Fig. 1), represented at 31' and 32' in Fig. 2D, wherein the circuits include tubes 334 and 335 of the 6J6 type. The "fugitive one" signals are developed whenever the capacity of the highest order is exceeded, additive carries of the "fugitive one" type triggering the left-hand flip-flop 31', and subtractive carries of the "fugitive one" type similarly affecting the right-hand flip-flop 32'.

Consider first a subtractive "fugitive one" signal developed when the sign of the total in the accumulator is changed from plus to minus or the balance established by the computation is put into overdraft, as, for example, Case II above set forth. In Case II, the old balance of +222 is reduced to a new balance of −222 by a negative entry of 444, and the tube setting was changed from the "2" to the "7" tube in each order. The tube setting in the "hundreds" order was first changed from the "2" tube to the "7" tube by counts applied at input tube 336 (Fig. 2C) and effective over subtractive pulsing line 337, as augmented by the subtractive carry from the "tens" order applied by transfer-effecting tube 332, also to the subtractive pulsing line 337.

During the conduction switching sequence in the "hundreds" order, the "0" tube becomes conducting, and the sudden increase in its cathode potential at point 341 (Fig. 2C) is transferred over leads 342 and 343 to raise the potential of junction point 344 (located between the one-megohm voltage-dividing resistors 345 and 346) relative to its former level established by the −250 volt supply applied at terminal 347 (Fig. 2F) by way of lead 348, the 100,000 ohm resistor 349, and lead 350.

The right-hand triode section of transfer control tube 333 is thus primed by way of its control grid 360, and the 50 micro-microfarad condenser 361 is charged to the potential level of junction point 344. Subsequently, when conduction is established in the "9" tube, its cathode potential at point 362 (Fig. 2D) is suddenly elevated, which potential change pulses the 50 micro-microfarad condenser 363 over leads 364 and 365 to establish full or heavy conduction in the right-hand triode section of tube 333, the charge on condenser 361 having held over even though the D.C. potential distribution was altered when the "0" tube was extinguished as the "9" tube assumed the conducting state.

The potential at the anode 366 of transfer control tube 333 drops due to the increased voltage across the 30,000 ohm anode load resistor 367, and this drop is effective over leads 368, 369 and 25 micro-microfarad condenser 370 and 500 micro-microfarad condenser 371 to decrease the potential of control grid 372 of flip-flop tube 335 relative to the potential level of cathode 373, thereby temporarily changing conduction from the left-hand triode section of the flip-flop tube 335 to its right-hand section.

The foregoing action is achieved because of the common cathode resistors 374 and 375 and the storage condenser 371 connected between the anode 376 of the right-hand tube section and the control grid 372 of the left-hand tube section. The condenser charge and the current through the one-megohm discharge resistor 377, which connects one plate of the condenser to the 210 volt supply voltage terminal 273 (Fig. 2B) by way of lead 378, determine the voltage level of control grid 372 relative to ground. The common cathode resistor 374 is a fixed 1,000 ohm resistor, but the common cathode resistor 375 is adjustable between zero and 3,000 ohms to permit adjustment of the threshold or normal operating voltage level of the control grid 372 relative to the cathode 373.

The voltage distribution between discharge resistor 377 and the cathode resistors 374 and 375 establishes the normal operating conditions of the flip-flop 32', the left-hand tube section being normally operative and the right-hand tube section normally cut off or inoperative. The right-hand section is normally biased beyond cutoff because its control grid 379 is grounded, but the common cathode potential is above ground by the voltage drop through cathode resistors 374 and 375 occasioned by current flow in the left-hand triode section. The normal cathode bias is of the order of 25 volts, so that the right-hand triode section does not draw current.

The application of a negative going pulse to condenser 371 from transfer control tube 333 triggers the flip-flop 32' to shift conduction from the left-hand triode section to the right-hand triode section. This pulse drives the left-hand tube section toward cutoff, which reduces the current through cathode resistors 374 and 375 to reduce the cathode bias effective on the right-hand tube section. Consequently, the right-hand tube section begins to draw current, which reduces the potential at anode 376 due to the increased voltage drop in the 51,000 ohm anode resistor 380, thereby reenforcing the negative going pulse applied to left-hand control grid 372. As the potential of the anode 376 is further lowered, the condenser 371 is discharged through resistor 377, thereby increasing the negative bias applied to control grid 372. This action is cumulative until conduction is established in the right-hand tube section, with the left-hand section being cut off.

Normal operating condition for the flip-flop 32' is automatically reestablished when the condenser discharge current through resistor 377 becomes insufficient to maintain the negative or cutoff bias at control grid 372 relative to the common cathode 373. As the left-hand section assumes its normal, or conducting condition, the resulting current flow through cathode resistors 374 and 375 biases the right-hand section beyond cutoff. By adjusting the value of cathode resistor 375, the interval of conduction in the right-hand tube section is controlled. Ordinarily an "off" or delay interval of 100 micro-seconds suffices to cause the entry of "fugitive one" signals into the various orders at a time different from the time of original entry of digit-representing pulses into the orders, thereby precluding any simultaneous entries.

The substractive "fugitive one" signal developed at the flip-flop 32' is a negative signal corresponding to the decrease in potential at the anode 381 of the left-hand triode section due to the increased voltage drop in 27,000 ohm anode resistor 382 when the flip-flop reassumes its normal operating condition. This signal is developed across a 1,000 ohm resistor 383 connected to ground and to the anode 381 by a lead 384 including a 150 micro-microfarad coupling condenser 385. A rectifier 386 of the germanium type 1N34 is connected in parallel with the resistor 383 to clamp the potential at junction point 387 between the resistor and the rectifier against rises. Hence, when the subtractive "fugitive one" carry from the "hundreds" order transfer control tube 333 causes a shift in conduction in the flip-flop 32' from the left-hand triode section to the right-hand triode section, the rising potential at the anode 381 is rendered ineffective at junction point 387 because of conduction in the rectifier 386. However, when the flip-flop 32' automatically shifts conduction back to the left-hand triode section, the resulting decrease in potential at the anode 381 is transferred by condenser 385 to the resistor 383 in the form of a negative pulse.

The negative pulse in accordance with the subtractive "fugitive one" carry out of the highest order, but delayed by approximately 100 micro-seconds by the flip-flop action, is applied over lead 388 from the junction point 387 to the right-hand control grid 401 of a 6J6 tube 402 (Fig. 2B), connected as the transfer-effecting tube for the "units" order. A fixed positive bias is maintained on the control grids 401 and 403 of the tube 402 relative to the grounded cathode 404. The biasing voltage is obtained from the +30 volt supply terminal 219 (Fig. 2A) by way of a lead 405 and the one-megohm grid resistors 406 and 407.

Conduction in the tube sections of transfer-effecting tube 402 is controlled by the application of anode potential to one or the other of the anodes 408 and 409. The right-hand anode 408 is connected through a 27,000 ohm plate load resistor 410 and lead 411 to the normally-closed contacts R5c1b (Figs. 2D and 3) of a normally deenergized relay coil R5. Also, the left-hand anode 409 is connected through a 27,000 ohm plate load resistor 412 and lead 413 to the normally open contacts R5c1a of the relay coil R5. From these contacts, the anode supply circuit is common over lead 414, normally-closed contacts R6b5 of a normally deenergized relay coil R6, a 100 ohm resistor 415 in lead 416, and lead 378 (Fig. 2D) to the +210 volt supply terminal 273 (Fig. 2B) corresponding to source 69 in Fig. 3. The relay contacts R6b5 are only open when the capacity of the accumulator is exceeded minus and plus the delay times, each of approximately 10 milli-seconds, allotted for the relay coil R6 to close and open its associated contacts.

Under normal operating conditions—i.e., when the amount in the accumulator is real or positive and within the accumulator capacity—the relay coils R5 and R6 are deenergized and contacts R6b5 and R6c1b are closed, providing a B+ power supply path from +210 volt terminal 273 (Fig. 2B) to anode 408 of the "units" order transfer effecting tube 402. This causes conduction in the righthand section of tube 402, since the control grid 401 is positive relative to the common cathode 404.

The subtractive "fugitive one" signal from flip-flop 32' (Fig. 2D) is applied over lead 388 and 1,000 micro-microfarad coupling condenser 417 to the control grid 401 of transfer-effecting tube 402. This negative signal momentarily cuts off the righthand section of tube 402, causing the potential of its anode 408 to rise. The sudden anode rise in potential pulses the subtractive pulsing line 179 by way of 1,000 micro-microfarad isolation condenser 418 and rectifier 419 in the manner of input pulses under the control of input tube 201 (Fig. 2A). In the absence of the "fugitive one" entry, the "8" tube (not shown) of the "units" order would be conducting but the pulse in accordance with the "fugitive one" signal applied to negative pulsing line 179 shifts conduction to the "7" tube (not shown) of the "units" order. Hence, the tube setting becomes 777, and the complementary answer is −222.

The operation of the additive "fugitive one" control is similar to the operation just described. The flip-flop 31' including tube 334 (Fig. 2D) is identical to flip-flop 32' previously described, and the left-hand tube section of the "units" order transfer-effecting tube 402 (Fig. 2B) enters additive "fugitive one" signals as delayed in the flip-flop 31' into the "units" order when the accumulator total is changed from a minus to a plus value. The use of an additive "fugitive one" correction will be described next.

In Case VI, above set forth, the accumulator content was changed from −555 to +222 by the introduction of a +777 amount. In the "hundreds" order, the tube setting was shifted from conduction in the "4" tube to conduction in the "2" tube by the direct entry of seven counts and one additive carry from the "tens" order. When the "9" tube became conducting in the conducting shifting sequence, the transfer control tube 333 was primed by way of its control grid 441, due to the increased potential at cathode junction point 362 of the "9" tube 442 (Fig. 2D). This increased potential is effective over lead 364 to increase the potential at junction point 443 between the one-megohm resistors 444 and 445, and to charge 50 micro-microfarad condenser 446 proportionately.

When conduction is shifted from the "9" tube 442 to the "0" tube 447, the left-hand triode section of transfer control tube 333 becomes conducting, due to the elevated potential at junction point 341 in the cathode circuit of the "0" tube 447, which potential is effective over lead 342 and 50 micro-microfarad condenser 442 to augment the charge held over by condenser 446, so that the control grid 441 permits conduction. The resulting decrease in potential at the anode 449 is effective over leads 450 and 451 to trigger the flip-flop 31' from normal conduction on its left-hand triode section to temporary conduction on its right-hand triode section precisely in the manner explained in connection with the flip-flop 32'. When the flip-flop 31' returns to its normal state, the voltage drop appearing across grounded resistor 452 in accordance with the additive "fugitive one" signal sends a negative pulse from junction point 453 by way of lead 454 and isolation condenser 455 to the left-hand control grid 403 of the transfer-effecting tube 402.

The left-hand triode section of the "units" order transfer-effecting tube 402 is in a conducting condition, as determined by relay contacts R5c1a, which are closed to supply B+ power by way of lead 413 to the anode 409. Consequently, the negative signal in accordance with the additive "fugitive one" signal from flip-flop 31' cuts off the left-hand section of tube 402, causing a positive pulse to pass to the additive pulsing line 152. This pulse shifts conduction from the "1" to the "2" tube of the "units" order, as is indicated in the answer of +222 for the problem of Case VI.

The relay contacts R5c1b and R5c1a (Fig. 2D) are grounded through the 0.25 microfarad condensers 452 and 453, which are alternately in series with the 100 ohm resistor 415 to constitute RC circuits. The RC circuits prevent the sudden application of the 210 volt B+ supply from terminal 273 from acting as a count at the "units" order by breaking up the steep wave front.

Figure 2F:
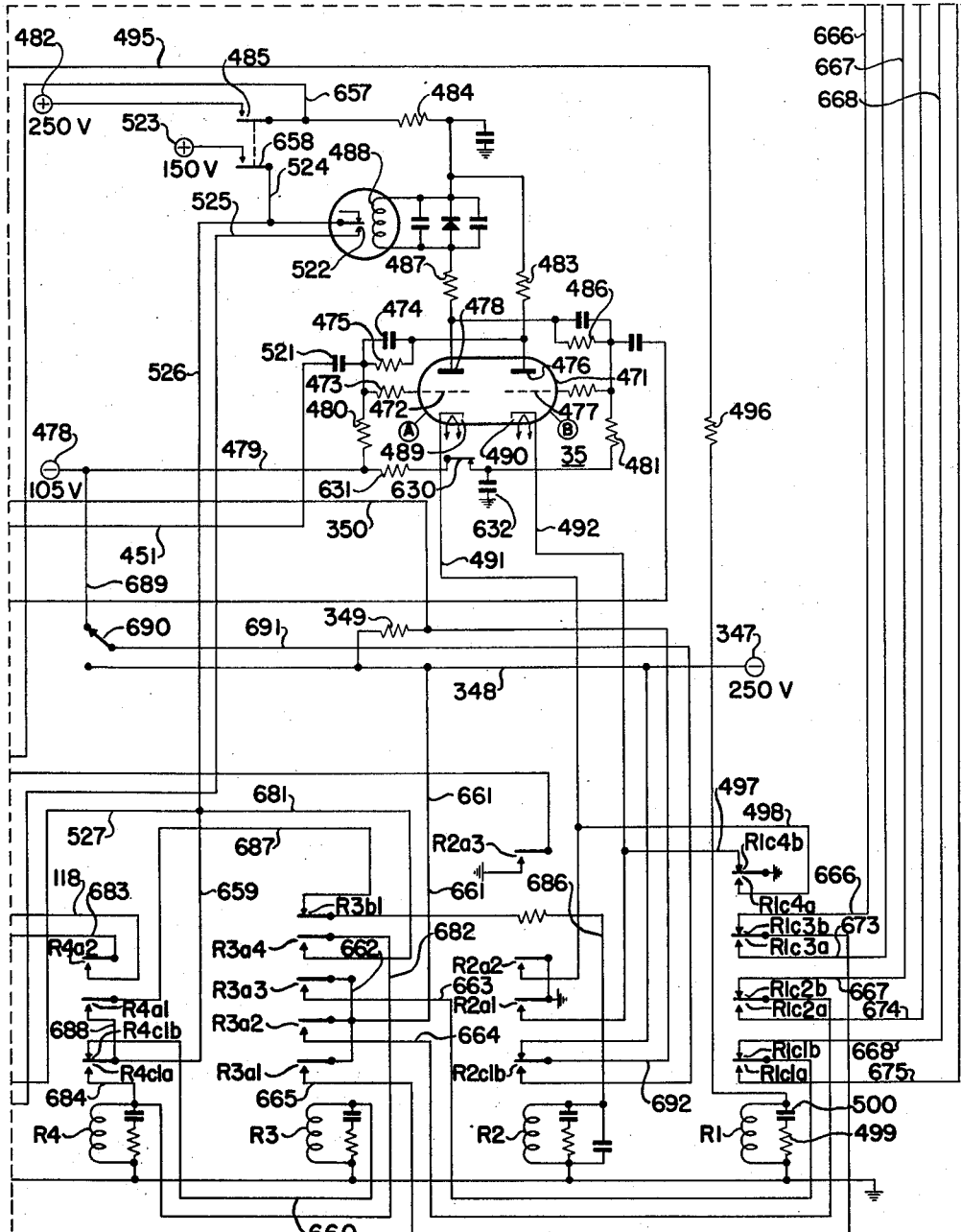

The operation of relay coil R5 and hence contacts R5c1b and R5c1a, which control the application of the B+ power to the anodes of the "units" order transfer-effecting tube 402, is under the control of the main memory 35 (Fig. 1), which includes the duo-triode tube 471 shown in Fig. 2F.

*The main memory*

The memory tube 471 has sections "A" and "B" connected as a trigger pair in which, of course, only one tube section conducts at a time. The conducting section remains on until a negative pulse is applied to its control grid. Conduction is then automatically shifted to the other tube section due to circuit interconnections. Also, the application of a negative pulse to the nonconducting tube section has no effect on the trigger pair. The control grid 472 of section "A" is connected through a 100 ohm grid resistor 473 and a parallel RC network, including a 100 micro-microfarad condenser 474 and 220,000 ohm resistor 475 to the anode 476 of section "B." The control grid 477 of tube section "B" is similarly connected back to the anode 478 of tube section "A."

A D.C. biasing supply of −105 volts is applied at terminal 478, which terminal is connected over lead 479 to a pair of biasing resistors 480 and 481 of 220,000 ohms each. The biasing resistors are part of a voltage dividing network between the 250 volt B+ supply applied at terminal 482 and the −105 volt biasing supply applied at terminal 478. One path between the terminals includes biasing resistor 480, resistor 475, a 47,000 ohm load resistor 483 for tube section "B," and a 1,000 ohm common resistor 484. A presenting switch 485 completes the path when closed. The other path includes resistor 481, resistor 486, which corresponds to resistor 475 of the first mentioned path, a 42,000 ohm anode or load resistor 487 for tube section "A," a relay coil 488 having a D.C. resistance of 5,000 ohms and the common resistor 848. The cathodes 489 and 490 of tube sections "A" and "B" are normally grounded over leads 491 and 492, respectively.

However, when operation of the accumulator is initiated after it has been cleared or turned off, the memory tube 471 must be in the proper condition because it is only controlled or switched thereafter by "fugitive one" signals, i.e., those carries developed when the sign of the total is changed. The correct condition for memory tube 471 is initially determined by a relay coil R1 (Fig. 2F) under the control of the "add-subtract" switch 216 (Fig. 2A). The armature or blade 493 of the "add-subtract" switch 216 is adapted to connect a +150 volt power supply, applied at terminal 494, to a lead 495 when the switch 216 is thrown to the "subtract" position. The lead 495 extends to one side of the relay coil R1 (Fig. 2F) by way of a 10 ohm resistor 496, the other side of the relay coil R1 being grounded or otherwise returned to a suitable connection in the power supply (not shown).

When the "add-subtract" switch 216 (Fig. 2A) is in the "add" position, no voltage is applied to lead 495 so that the relay coil R1 (Fig. 2F) is deenergized. Relay contacts R1c4b remain closed as long as relay coil R1 is in the deenergized condition so that the lead 492 from cathode 490 of the "B" section of memory tube 471 is grounded through lead 497. If the accumulator and consequently, the memory tube 471 had previously been off, the "B" section would assume the conducting condition when its cathode was grounded over relay contacts R1c4b because of the voltage distribution from biasing terminal 478 as distributed between the control grid 477 and the anode 476. Hence, if the initial entry is a positive or additive amount, the "add-subtract" switch 216 is set in the "add" position with the armature 493 in the position shown and the relay coil R1 is deenergized so that conduction is established in the "B" section of the memory tube 471. This section is controlling when the balance in the accumulator is a real or a positive amount.

However, if the balance or amount in the accumulator is in overdraft—i.e., a negative amount—the "A" side of the memory tube 471 must be controlling in order to establish a complementary indication. Accordingly, if a negative amount is the first figure entered into the accumulator after it is turned on, the "add-subtract" switch 216 is thrown to the "subtract" position so that the armature 493 applies the +150 volt source at terminal 494 to lead 495, which energized relay coil R1 to open relay contacts R1c4b and close relay contacts R1c4a. In this event, cathode 489 of the "A" section of memory tube 471 is grounded over leads 491 and 498 to establish conduction in the "A" tube section initially.

A 250 ohm resistor 499 and a 0.1 microfarad condenser 500 are connected across the relay coil R1 and cooperate with the series resistor 496 in the power supply lead 495 in minimizing transients when the relay coil is energized and deenergized.

Reference to the tabulation of Fig. 4 shows that the condition of the memory tube 471 is changed in the computation of Case VI wherein the balance was changed from overdraft to real. Before the pulses, representing the amount 777 to be entered, are applied to the counting order, section "A" of memory tube 471 is in the conducting condition. But after pulsing, section "B" is the conducting section. The Case VI entry caused the conduction switch-over in the memory tube. Since the balance in the accumulator before pulsing was negative or in overdraft, and after pulsing it was positive or real, conduction in the "B" section signifies a positive or real balance in the accumulator.

The condition of the memory during operation is actually determined by the carry signals from the "hundreds order," particularly the carry signals from which the "fugitive one" signals are derived. This is accomplished by way of the control grids 472 and 477 of the main memory tube 471 rather than by grounding one of the cathodes 489 and 490 in the manner used initially to select the appropriate tube section for conduction.

The negative pulses developed at the anodes 449 and 366 of the "hundreds" order transfer control tube 333 (Fig. 2D) in accordance with positive and negative carries out of this order are used for switching the memory tube 471. When the balance in the accumulator is changed from overdraft to positive or real (as in Computation VI), it is the carry signal from the "hundreds" order which causes sufficient conduction in the left-hand section of transfer control tube 333 (Fig. 2D) to produce a negative pulse at the anode 449. This negative pulse is effective over leads 450 and 451 including a 25 micromicrofarad coupling condenser 521 to decrease the potential of control grid 472 of the main memory tube 471 (Fig. 2F) thereby allowing tube section "B" to assume the conducting state with section "A" of the trigger pair relaxing.

Similarly, when the capacity of the "hundreds" order is exceeded in the negative direction and the balance in the accumulator is changed from positive or real to overdraft, the right-hand section of transfer control tube 333 (Fig. 2D) is caused to become sufficiently conductive as to produce a negative pulse at the anode 366, which pulse is effective over leads 368 and 369 to decrease the potential of control grid 477 of the main memory tube 471 (Fig. 2F) such that the "B" section of the memory tube 471 becomes non-conductive with the "A" section assuming control, as in Case II.

Conduction in the "A" section of the memory tube 471 causes its anode connected relay coil 488 to be energized, resulting in closure of contacts 522. The 150 volt positive source applied at terminal 523 is thus connected by way of the presetting switch 658 and leads 524 and 525 to relay coil R5 (Fig. 2D). Energization of relay coil R5 causes its contacts R5a3 to close thereby completing a circuit from the +150 volt terminal 523 (Fig. 2F) over leads 524, 526, 527 and 528 to one side of a solenoid 529 (Fig. 2C), the other side of the solenoid being connected to common ground lead 530.

A filter network including a 2,500 ohm resistor 531 (Fig. 2D), a 20 microfarad condenser 532 connected in parallel therewith, and a 10 ohm resistor 533 in series with the parallel combination is disposed in the circuit including lead 528, between the solenoid 529 (Fig. 2C) and the 150 volt power source applied at terminal 523 (Fig. 2F). The filter network is effective to smooth the wave fronts developed when the solenoid 529 is operated to an "on" or "off" condition and also to suppress any transients in this circuit thereby rendering any such disturbances ineffective to influence the desired count in the denominational orders.

*The indicator*

When the solenoid 529 (Fig. 2C) is in its deenergized condition, the associated overdraft indicating structure, including a horizontal base or connecting member 534 and three indicia bearing columns 535, 536 and 537 is partially obscured behind the face panel 538. The indicating structure observable (in the position shown in Fig. 2C) is for real or positive balance indications, the left-hand indicia bearing column 539 being provided for the "hundreds" order digit, the intermediate column 540 for the "tens" order digit and the right-hand column 541 for the "units" order digit.

The numerals "0" through "9" appearing on the columns 539–541 are illuminated by light from the neon bulbs located behind the panel 538 and to the left of the columns. If, for example, a real or positive balance of 222 is stored in the accumulator as at the conclusion of Case VI, the neon tubes 551, 552 and 553 will be conducting to illuminate the "2" digits of the columns 539, 540 and 541 respectively.

Conduction is established in neon tube 551 by the cathode potential of the "2" tube 554 (Fig. 2C) of the "hundreds" order. When the counting tube 554 is fired, the potential level of its cathode junction point 555 is elevated to approximately +75 volts. From the point 555 a pathway including a 2,400 ohm resistor 556, lead 557, and a 47,000 ohm resistor 550 extends to the cable 559 (Fig. 2D). The cable is continued in Fig. 2C with the conductor 557 completing a current path through a current limiting resistor 558 of 100,000 ohms, through the tube 551, and thence to a negative voltage terminal 572 at which a —37 volt potential source is applied. The 112 volt difference between the cathode junction point 555 and negative terminal 572 is sufficient to cause the neon tube 551 to glow vigorously and illuminate the "hundreds" digit "2." Similar connections are provided over cables 560 and 561 (Fig. 2A) to cause the digits "2" to be illuminated by conduction in the neon tubes 552 and 553 for the "tens" and "units" order respectively. Hence, the answer of 222 to the Case VI computation is selected for indication in accordance with the potential level of the cathodes of the answer tubes.

Overdraft indication is accomplished in a similar manner except that the nine's complement of the digits represented by the conducting tubes are indicated. For example, consider the computation of Case II wherein the answer is —222 but the "seven" tube of each order is conducting, signifying the complement of the number 222. Since the balance of the Case II computation is negative, the memory device 35 (Fig. 2F) is operated to the "A" condition to energize the relay coil 488 and cause its contacts 522 to be closed. As was mentioned this action energizes relay coil R5 (Fig. 2D) which in turn provides a completed power circuit to solenoid 529 (Fig. 2C) by way of relay contacts R5a3.

Energization of the solenoid 529 moves the plunger 562 to the left (within the solenoid) and, by connecting link 563 imparts a similar movement to the horizontal frame or base member 534 and associated overdraft indicating structure. This is permitted by the slots 564 which slide along pins 565 in the manner of a guideway. The vertical indicia bearing columns 535, 536, and 537 then occupy positions overlying the positive or real indicia bearing columns 539, 540 and 541, respectively.

At the conclusion of the Case II computation, the "7" tubes of each order are conducting because the "7" digit representing neon tubes 566, 567 and 568 are rendered conducting by way of circuits extending from the cathodes (not shown) of the counting tubes which represent the digits "7" in each order and along the cables 559 (Fig. 2C) 560 and 561 (Fig. 2A) to the common negative source applied at terminal 559 (Fig. 2C). However, since the overdraft columns 535, 536 and 537 are the only indicia columns visible when the balance is in overdraft, the amount 222 will be illuminated, thus providing a display of the true balance even though the counting tubes are set on the complement thereof. The overdraft columns are preferably colored red and the real columns black to provide an appropriate distinction between negative and positive balances.

So long as the main memory 35 remains in its overdraft condition, the solenoid 529 will remain energized and the overdraft indicia structure will be visible. The computations of Cases II through V are in this category. However, Case VI provides a real balance by shifting the memory device 35 to operation in condition "B" and thus deenergizes memory relay coil 488 (Fig. 2F). When the relay contacts 522 are opened, power is relieved from the solenoid 529 permitting the springs 569 and 570 (Fig. 2C) connected to the overdraft indicia bearing column 537 to return the overdraft structure to the obscured position shown.

The pairs of real and overdraft indicia bearing columns shown in Fig. 2C are provided in accordance with the number of denominational orders utilized. It will be appreciated then that an accumulator having a capacity of 999,999.99 or 8 denominational order counters will also require 8 pairs of indicia bearing columns for complete indication.

The indicator arrangement has been described for the indication of the accumulator content. If the capacity of the accumulator is exceeded, so is the capacity of the indicator exceeded, but the indicator will display the amount in the accumulator omitting only the digits which are beyond the capacity. However, while not indicated, these digits are not "lost" because the significant digits, thereof, are used to control the auxiliary memory and related controls to permit reentry without error. This is illustrated by the Case IV*b* computation wherein the excessive value is reduced to a correct value within the accumulator capacity. The cases involving computations which exceed the capacity of the accumulator will be used to aid in the detailed description of the auxiliary memory 61 and associated circuitry of Fig. 2D.

*The auxiliary memory*

The auxiliary memory includes a duo-triode tube 591 (Fig. 2D) of the 12AT7 type with associated components connected for operation in the manner of the memory device 35 of Fig. 2F. The right-hand triode section of the tube 591, marked "N" is operative during normal operations; i.e., computations involving amounts within the accumulator capacity, and the left-hand triode section marked "E" is operative when the accumulator capacity is exceeded. At the completion of the prior Case IV computation, the capacity is exceeded (see Fig. 4 tabulation), but before and during this transaction the balance is within the accumulator capacity. Case IV involves a subtractive entry of 333 combined with a negative balance of 888 to produce a new total of —1221 wherein the thousands digit is beyond the capacity of the three denominational order accumulator herein assumed for purposes of explanation of the principles used.

Referring to Fig. 4, it will be noted that before the entry of counting pulses in Case IV, the auxiliary memory tube 591 is operating in its normal condition with conduction in the right-hand triode section (N), but after the entry of pulses the operation has been shifted to the exceed (E) triode section. This is accomplished under the control of an otherwise inhibited carry signal from the "hundreds" order transfer control tube 333 (Fig. 2D). Since the capacity of the "hundreds" order is exceeded in a negative direction (due to the subtractive entry), the right-hand section of tube 333 provides a negative going pulse at its anode 366 which passes down conductor 368 to lead 369 and via lead 369' to contact arm 63' of the "add-subtract" switch 592 forming a part of the input circuit to the auxiliary memory 61 and associated circuitry. The contact arm 63' and its associated arm 62' are operated in conjunction with the contact arms 216 and 493 (Fig. 2A) of the main "add-subtract" switch, preferably by a mechanical interconnection (not shown).

Aso, from Fig. 4 it is seen that relay coil R6 is off or deenergized before the Case IV entry and is energized as a result of this entry. Relay coil R6 is only energized when the triode section "E" of the auxiliary memory tube 591 is conducting because the anode current from this triode section energized the sensitive relay coil 593 to close contacts 594 thereby supplying power from terminal 523 (Fig. 2F) to relay coil R6 over leads 526 and 527. Hence, the carry signal above mentioned passes over conductor 589 (from switch contact arm 63'), through now closed relay contacts R6b3, over lead 590 and through now closed relay contacts R5a1 (because relay coil R5 is energized all during the Case IV computation since the balance is in overdraft and section "A" of the main memory device 35 (Fig. 2F) is controlling), to the input circuit of the "N" section of the auxiliary memory tube 591 by way of lead 595. Since this pulse is negative, conduction is switched from the "N" to the "E" section of auxiliary memory tube 591 and relay coil R6 is energized. This closes relay contacts R6a3 to operate the Exceed signal 596 by way of lead 597 from +210 volt terminal 598.

In Fig. 4 there is listed, under the heading "EN Route," the relay contacts which complete a path or route for the operation of the auxiliary memory circuit 61 (Fig. 2D). This operation, wherein conduction was shifted from the "N" or normal to the "E" or exceed section of tube 591, was just described using relay contacts R6b3 and R5a1.

Also listed in the table of Fig. 4 is a similar column for the main memory 35 under the heading of "AB Route." This column lists—"R6b2 No Eff."—for the Case IV computation after the pulsing entry. The listing indicates that even though there exists a route by way of contacts R6b2, the signal over this path has no effect to alter the condition of the main memory 35. The relay contacts R6b2 are located in the lead 369 (Fig. 2D) between the "hundreds" order transfer control tube 333 and the "B" section of the main memory tube 471 (Fig. 2F). The contacts R6b2 are closed when the carry signal is developed at the anode 366 of transfer control tube 333 because the relay coil R6 is slow to pull in after it is energized. But the "A" section of the main memory tube 471 is controlling all during the Case IV example, so the application of a negative pulse to the control grid 477 of the "B" section has no effect and the "A" section remains conductive as is indicated in the table of Fig. 4.

The computation of Case IVa which reduces the excessive value to a value still beyond capacity is handled with ease. There are no carries or "fugitive one" signals developed in this problem so the main and auxiliary memories are unaffected. The main memory tube 471 (Fig. 2F) remains operative in its "A" section and the auxiliary memory tube 591 retains conduction in the "E" section since the balance has not yet been returned to a value within the accumulator capacity.

In the Case IVb example, the negative balance of 1110 is reduced by the additive entry of 222 to a value of —888 which is within the accumulator capacitor. An additive carry signal is developed at the anode 499 of the "hundreds" order transfer control tube 333 when the additive entry causes the "hundreds" order tube setting to pass through zero in changing from the "8" to the "1" tube. (See the Case IVb example supra.) This carry signal is inhibited insofar as the main memory tube 471 is concerned because relay coil R6 is still energized when the signal is developed and consequently, relay contacts R6b1 in lead 451 are open so that the circuit between the anode 499 of tube 333 and the control grid 472 of the "A" section of the memory tube 471 is interrupted.

However, the carry signal can follow a path over leads 450, 451 and to the upper contact arm 62' of the "add-subtract" switch 592. This switch is in the "add" position because of the Case IVb additive entry of 222 so that the carry signal path extends over leads 600 and 601, through contacts R6a2, via lead 602, contacts R5a2 and lead 603 to the "E" section of the auxiliary memory tube 591. The relay contacts R5a2 are of course closed because relay coil R5 is energized all during the Case IVb computation since the balance is still in overdraft and section "A" of the main memory is controlling.

The carry signal is a negative going pulse so operation of the auxiliary memory tube 591 is shifted from the "E" section to the "N" section and relay coil R6 is deenergized. The Exceed signal 596 is released by way of relay contacts R6a3 because the balance is now —888, a value within the capacity of the accumulator.

Other cases involving the exceed circuitry in a manner similar to that just described, but wherein the capacity is exceeded in a positive direction will now be explained. They include Cases VIII, VIIIa and VIIIb. Since the balance is always positive throughout these examples, the main memory 35 (Fig. 2F) will remain in its "B" condition of operation in the computation of Case VIIIb will be inhibited insofar as the operation of the main memory is concerned so that the answer will be correct.

Considering first Case VIII, the old balance of +666 is increased by the additive entry of 555 to a new total of +1221, a value which is beyond the capacity of the illustrated accumulator. The excessive entry causes the tube setting of the "hundreds" order to be changed from the "6" tube to the "1" tube which action operates the left-hand triode section of the "hundreds" transfer control tube 333 (Fig. 2D) to provide an additive carry signal at the anode 449.

The old and the new balance of Case VIII are both real or positive so the "B" section of main memory tube 471 (Fig. 2F) is controlling and the application of a negative signal from tube 333 to the "A" section by way of leads 450 and 451, and closed relay contacts R6b1 does not disturb this condition of the main memory tube. However, this negative signal does change the operation of the auxiliary memory tube 591 (Fig. 2D) from the "N" section to the "E" section signifying the capacity has been exceeded.

The path for this signal comprises leads 450, 451, 599, contact arm 62' of switch 592, which is in the "add" position because of the additive entry, closed relay contacts R6b4 (because relay coil R6 is still deenergized) lead 604, relay contacts R5b2 (because relay coil R5 is also deenergized) and lead 595 to the control grid 605 of the "N" section. When section "E" of the auxiliary memory device 61 is made conducting, the relay coil R6 is energized so that its contacts R6a3 are closed to permit the operation of the Exceed signal 596 which action concludes the Case VIII computation.

In Case VIIIa the old balance from Case VIII is reduced from +1221 to +1110, a value still in excess of the capacity by the subtractive entry of 111. Since the capacity of the "hundreds" order is not exceeded in either direction by this entry, there are no negative signals indicative of "fugitive one" or carry signals developed so that the condition of the main memory device 35 (Fig. 2F) and the auxiliary memory device 61 (Fig. 2D) are not altered and accordingly the Exceed signal 596 remains operated.

However, in Case VIIIb the excessive old balance of +1110 is reduced to +888, a value within the accumulator capacity, due to the subtractive entry of 222. Since the new balance is within the accumulator capacity, the auxiliary memory 61 will have been returned to the "N" condition and the Exceed signal 596 will have been deactivated. This is effected by the negative signal developed at the anode 366 of the right-hand section of the "hundreds" order transfer control tube 333 when the "hundreds" order tube setting is changed in a subtractive direction from the "1" tube to the "8" tube by the subtractive entry of 222. The path for this signal is via leads 368, 369', lower contact arm 63' of switch 592 (which is in the "subtract" position), relay contacts R6a1, closed because relay coil R6 is energized, over lead 606 and relay contacts R5b1 (which are normally closed) and by way of lead 603 to the control grid 607 of the "E" section of the auxiliary memory tube 591.

However, this negative signal is blocked from affecting the condition of the main memory device 35 (Fig. 2F) because relay contacts R6b1 in lead 451 are open since relay coil R6 is energized so long as the "E" section of the auxiliary memory tube 591 is conducting. All circuits are now in a normal condition because the new balance of Case VIIIb is a positive or real amount (the "B" section of the main memory device 35 is operative) and the "N" section of the auxilary memory device 61 is operative.

In the tabulation of Fig. 4, an inhibited carry or negative signal is indicated by a capital C enclosed in parenthesis (C). Also included within the parenthesis is the sign which is indicative of the entry which produced the signal. The sign also determines the direction in which the capacity of the "hundreds" order was exceeded. The term "inhibited" is with respect only to the main memory 35 as certain of these signals have been used to alter the condition of the auxiliary memory 61. The effect of these negative signals of the carry inhibited type on the auxiliary memory and the lack of effect on the main memory has just been presented in respect to the computations of Cases IVb, VIII, and VIIIb.

In Case IV there is also developed a negative signal indicated as inhibited which is similarly handled. The tabulation of Fig. 4 reveals the conditions of the important components before and after pulsing the entry for this case computation. The old balance from Case III is −888 which is an overdraft condition so section "A" of the main memory 35 is controlling. This balance is within the accumulator capacity so section "N" of the auxiliary memory 61 is conducting. However, the −333 entry, when combined with the old balance, yields a Case IV balance of −1221, a value in excess of capacity. The transfer pulse out of the "hundreds" order is a carry signal of the subtractive kind which is effective to change the auxiliary memory 61 to operation in the "E" section but is ineffective to influence the main memory 35.

Since the computation involves a subtraction, the negative carry or transfer pulse is developed at the anode 366 of the "hundreds" order transfer tube 333 (Fig. 2D) when the capacity is exceeded. Relay coil R6 is de-energized at this time so this pulse can follow a path over conductor 368, contacts R6b2 and lead 369 to the "B" section of main memory 35 (Fig. 2F). The pulse is ineffective here because section "B" is already cut off. However, the negative pulse is used to switch the state of the auxiliary memory device 61 (see the tabulation of Fig. 4).

The path for this operation is listed under the heading "EN Route" as including relay contacts R6b3 and R5a1. The negative pulse from transfer control tube 333 is applied over leads 368, 369, and 369′ to the contact arm 63′ of the "add-subtract" switch 592 (Fig. 2D). From here the path extends over lead 589, contacts R6b3 and R5a1 and by way of lead 595 to the "N" section of the auxiliary memory tube 591. The result of the application of a negative pulse to this tube section is the shifting of conduction to the "E" section with the consequent operation of the "Exceed" signal 596 as relay coil R6 is energized. The "Exceed" signal subsequently is deactivated when the capacity is reentered as a result of the carry signal developed in the Case IVb computation.

The foregoing discussion concludes the description of the circuitry over which carry signals control the auxiliary memory device. Next to be considered is the circuitry which precludes the special type carry signals—i.e., the "fugitive one" signals from influencing the auxiliary memory. A "fugitive one" signal which is effective as a correction is indicated by a capital F. Also, as in the case of carries, the accompanying sign is indicative of the type entry—i.e., additive or subtractive and the sign of the new balance.

In Cases II and VI, the "fugitive one" signals are effective with respect to the main memory tube 471, and accordingly are depicted in Fig. 4 without any enclosing parenthesis. The desired functions performed by these signals have previously been discussed, but insofar as the auxiliary memory is concerned, the signals are ineffective. In Case II, a subtractive entry is made, and the auxiliary memory input switch 592 (Fig. 2D) is accordingly in the "subtract" position. Both relay coils R5 and R6 are deenergized (see Fig. 4) so that contacts R6a1 and R5a1 are open. The negative signal developed at the anode 366 of the "hundreds" order transfer control tube 333 is thus prevented from pulsing either control grid 605 or 607 of the auxiliary memory tube 591.

Similarly, the negative signal developed at the anode 449 of tube 333, as a result of the Case VI computation, is also prevented from influencing the condition of the auxiliary memory tube 591. The relay coil R5 is energized at this time and contacts R5b2 are open so that the signal developed at the anode 449 is prevented from influencing the potential of control grid 605 of the operating "N" section of the auxiliary memory tube 591. Hence, in each instance the negative signals represented by the symbols F or C of Fig. 4 perform only the desired function.

Resetting

The accumulating function has now been explained in detail. During the accumulating process or at the beginning or conclusion of a series of computations, it may be desirable to reset the denominational orders to zero. This is conveniently and automatically accomplished under the control of a resetting push button 621 (Fig. 2C) which controls circuitry for establishing conduction in the "0" tubes 100, 622 (Fig. 2A) and 447 (Fig. 2C) of the respective denominational orders. This circuitry is identical in respect to each of the "0" tubes and accordingly the description will relate particularly to the "0" tube 100 of the "units" order. The control grid 180 is connected through the 47,000 ohm grid resistor 182 and a one-megohm grid biasing resistor 623 in lead 624 to a common biasing lead 625. The screen grid 165 is also connected to the common biasing lead 625 by way of the 47,000 ohm grid resistor 166 and the one-megohm grid biasing resistor 161 in lead 620. The common lead 625 is in a D.C. biasing path including the push button 621 (Fig. 2C), a 100 ohm resistor 626 and leads 627 and 633 which connect to common lead 144 from the normal −75 volt biasing supply terminal 146 (Fig. 2A).

Hence, when the switch 147 is in the position shown, the negative potential from −75 volt terminal 146 is applied to the control grid and screen grid circuits of each of the "0" tubes. This negative biasing source also normally supplies the control and screen electrodes of each of the counting tubes of the various denominational orders by way of the common lead 144, for example, in the "units" order.

However, when it is desired to reset the denominational orders to zero, the push button switch 621 is merely depressed, interrupting the biasing circuit to the control and screen electrodes of the "zero" tubes to permit conduction in these tubes, which action, as has already been explained, extinguishes the otherwise conducting tube of each order because of the common anode resistor (119 in the "units" order) in the common B+ supply provided at terminal 117 in Fig. 2D. The 100 ohm resistor 626 in series with the push button 621, the 0.1 microfarad condenser 629, and the 0.25 microfarad by-pass condenser 628 act as a filter to break up the steep wave front in the biasing potential when the push button switch 621 is operated. Thus the wave front does not act as a stray count.

When the accumulator is reset to zero, the main memory device 35 should also be adapted for operation in its real or positive section "B." This is accomplished by a switch 630 (Fig. 2F) connected in the biasing circuit for the control electrode 477 of the "B" section. The switch 630 is mechanically ganged to the push button switch 621 (Fig. 2C) so that when the latter is opened, the former relieves the biasing potential normally supplied by −105 volt terminal 478 (Fig. 2F) from the control electrode 477 of the "B" section to insure that conduction remains in or is switched to the "B" section.

A filter network in the form of the 100 ohm resistor 631 and a 0.1 microfarad condenser 632, which forms a by-pass to ground, is provided to break up or smooth the steep wave front occurring when the biasing potential is rapidly interrupted. Hence, the accumulator is automatically readied for receiving a new computation.

Presetting

The foregoing operation may also be accomplished in a different manner providing an entry is to be preset into the denominational orders. This entry may comprise a positive or negative amount. The presetting switches are shown in Fig. 2E. The upper set includes contact arms 651 and 652 for determining the amount set into the "units" order. The left-hand switch arm 651 is provided for the selection of positive digits whereas the right-hand switch arm 652 enables the nine's complement thereof to be set into the "units" order, which is the equivalent of introducing a negative digit into this order. Similarly, the switch arms 653 and 654 are adapted respectively to set in a positive or negative digit into the "tens" order and switch arms 655 and 656 preset the selected positive or negative digit into the "hundreds" order.

For the purpose of explanation, assume that the positive amount of 111 is to be preset into the accumulator. The first step to be performed is the setting of the "add" switch 493 (Fig. 2A) in the "add" position as is illustrated. This operation removes the 150 volt supply applied at terminal 494 from the common lead 495 which extends to the relay coil R1 (Fig. 2F). This operation insures that the relay coil R1 is deenergized so that its contacts R1c4b are closed thereby grounding the cathode 490 of the "B" section of the main memory device 35 by way of lead 492. Since the opposite set of contacts R1c4a are open, the cathode circuit of the "A" section is interrupted and by flip-flop operation the "B" section assumes the conducting condition. As has previously been explained the section "B" is the controlling section for positive or real numbers and controls the indicator arrangement of Fig. 2C so that a positive amount will be indicated.

Next the amount to be preset is entered by moving switch arms 651, 653 and 655 to the "1" contact positions. The preset switch 485 (Fig. 2F) is now closed to connect the 250 volt positive power supply applied at terminal 482 to the lead 657 which supplies anode potential to the auxiliary memory tube 591 (Fig. 2D). Closing of the preset switch 485 (Fig. 2F) also closes the relay power switch 658, which is ganged thereto, to connect the 150 volt positive power supply applied at terminal 523 to the common relay power supply lead 526 by way of lead 524.

An operating relay coil R4 (Fig. 2F) is inoperative at this time so that its contacts R4c1b are closed to extend the power circuit from lead 526 over leads 659 and 660 to the coil of a preset energizing relay R3. With relay coil R3 energized, its contacts R3a1, R3a2 and R3a3 are closed, extending the circuit from the −250 volt terminal 347 by way of lead 348 and lead 661 to the common lead 662 extending between these three contacts. The −250 volt potential source is thus connected over leads 663, 664 and 665 to the now closed relay contacts R1c1a, R1c2a and R1c3a.

The leads 666, 667, and 668 extend the negative power supply connection from the contacts of relay coil R1 to the switch arms 651, 653 and 655 respectively of the "units," "tens," and "hundreds," orders. (Fig. 2D.) Since each of the presetting switch arms is positioned on the "1" contacts, the negative potential is applied over the cables 561, 560 and 559 to the leads 669, 670 and 671 (Figs. 2A and 2C) which are in the cathode circuits of the "1" tubes of each of the denominational orders. The application of this highly negative potential pulls the cathodes of the "1" tubes so low that these tubes are in condition to be fired because the cathodes are at a lower potential than the control or screen electrodes.

It should be pointed out that the decrease in potential of the cathodes of the "1" tubes does not affect the potential of the control and screen electrodes of these tubes as they are supplied from the voltage dividing networks connected in the adjacent "0" and "2" tubes. For this reason the "1" tubes are in condition to be readily fired.

When relay coil R3 was energized, its contacts R3a4 closed to extend the voltage supply connection from common lead 526 over leads 681 and 682 to relay coil R4 thereby energizing this coil. Accordingly, its contacts R4a2 are closed to connect lead 118, which is the common anode supply lead for the tubes of each of the denominational orders, to the positive potential supply terminal 117 by way of lead 683 at which time the preselected tubes are fired.

Also when relay coil R4 was energized its contacts R4c1b were switched to the opposite position R4c1a to which established a holding circuit for the relay coil R4 by way of leads 684 and 659 which connect to the common relay power supply lead 526. The relay coil R4 remains energized during the operation of the accumulator. However, when the contacts R4c1b are switched to the opposite contacts R4c1a, the power supply path for the R3 relay coil becomes inoperative and remains so during subsequent accumulator operation.

The deenergization of the relay coil R3 opens the contacts R3a1, R3a2 and R3a3 to remove the −250 volt power supply from the cathode circuits of the "1" tubes of the various denominational orders. However, the "1" tubes remain controlling or in the conducting state and their cathodes assume the normal operating potential of approximately +75 volts as dictated by the cathode current flow to the cathode resistors.

Also, when relay coil R3 is deenergized, its contacts R3b1 are closed to energize relay coil R2 by way of leads 686, 687, now closed relay contacts R4a1 and leads 688 and 659 which connect to the common relay power supply lead 526. The relay coil R2 is a sequencing relay which provides delay time for certain events, now to be mentioned.

For example, energization of relay coil R2 grounds both leads 491 and 492 for the cathodes 489 and 490 of the main memory tube 471 by way of the now closed relay contacts R2a1 and R2a2. However, the section "B" of the main memory device 35 remains in the conducting condition because its circuit was initially completed by way of relay coil R1 which determined the condition of tube 471. The operation of relay coil R2 merely makes it possible for either section "A" or "B" to assume the operating condition under the influence of the "fugitive one" signals hereinbefore described.

The now closed relay contacts R2c1b apply a negative potential of 105 volts from terminal 478 (Fig. 2F) by way of lead 689, a normal transfer switch 690, lead 691, the contacts, leads 692, and lead 350 to the grid circuits of each of the transfer control tubes 333, 331 and 248.

This is the normal biasing arrangement on these transfer control tubes which insures that only one section, either the additive or subtractive transfer control section, will be operative at any one time. Also operation of the relay coil R2 closes its contacts R2a3 to ground the cathode 693 of the "E" section of the auxiliary memory tube 591 (Fig. 2D) by way of lead 694 which action now permits either section of the auxiliary tube 591 to assume the conducting condition under the influence of negative signals delivered from the "hundreds" order of the accumulator denominational bank.

It should be apparent that since the cathode 695 of the "N" section of this auxiliary memory tube 591 is always grounded, the normal section of the auxiliary memory tube assumes the conducting state when the preset switch 485 (Fig. 2F) is initially closed to apply power to the anode supply lead 657. The sequencing relay R2, like relay coil R4, remains on during subsequent accumulator operation.

The foregoing description reveals the versatile operation of the accumulator and its controls comprising the present invention. The accumulator per se, enables the automatic handling of addition or subtraction in each tive one" type to cause "fugitive one" entries through the "fugitive one" transfer means only when the auxiliary memory means is in said normal condition; and delay means connected between the highest order and the "fugitive one" transfer means for delaying the "fugitive one" type carry signals which are responsible for any corrective entry for a predetermined time interval to prevent interference between amount entries and corrective entries applied to the lowest order.

17. An electronic accumulator comprising a plurality of denominational orders, each including a plurality of tubes interconnected in ring fashion for operation in an additive or a subtractive manner; separate input means for each order for introducing additive entries thereto; further input means for each order for introducing subtractive entries thereto; means for transferring additive carry signals from each order to the next higher order when the capacity of the former is exceeded in an additive direction as the result of an additive entry; means for transferring subtractive carry signals from each order to the next higher order when the capacity of the former is exceeded in a subtractive direction as the result of a subtractive entry; "fugitive one" transfer means operable by carry signals of the "fugitive one" type from the highest order developed when the sign of the total is changed for introducing a corrective entry into the lowest order; a main memory responsive to the carry signals of the "fugitive one" type from the highest order and having a first and a second condition of operation for enabling the operation of the "fugitive one" transfer means by the "fugitive one" type carry signals only when the sign of the total changes; auxiliary memory means operable from a normal to an exceed condition by a carry signal of one sign when the capacity of the accumulator is exceeded in one direction and the main memory is in said first condition and operable from an exceed to a normal condition by a carry signal of opposite sign when the capacity is reentered; said auxiliary memory means being operated from a normal to an exceed condition by a carry signal of said opposite sign when the capacity of the accumulator is exceeded in the opposite direction and the main memory is in said second condition and operated from an exceed to a normal condition by a carry signal of said one sign when the capacity is reentered; said main memory and said auxiliary memory cooperating to enable carry signals of the "fugitive one" type to cause "fugitive one" entries through the "fugitive one" transfer means only when the auxiliary memory means is in said normal condition; and positive and negative indicating means settable as to amount from the tubes of the denominational orders and selectable as to sign under the control of the main memory.

18. An electronic accumulator comprising a plurality of denominational orders, each including a plurality of tubes interconnected in ring fashion for operation in an additive or a subtractive manner; separate input means for each order for introducing additive entries thereto; further input means for each order for introducing subtractive entries thereto; means for transferring additive carry signals from each order to the next higher order when the capacity of the former is exceeded in an additive direction as the result of an additive entry; means for transferring subtractive carry signals from each order to the next higher order when the capacity of the former is exceeded in a subtractive direction as the result of a subtractive entry; "fugitive one" transfer means operable by carry signals of the "fugitive one" type from the highest order developed when the sign of the total is changed for introducing a corrective entry into the lowest order; a main memory including a bistable state flip-flop responsive to the carry signals of the "fugitive one" type from the highest order for enabling the operation of the "fugitive one" transfer means by the "fugitive one" type carry signals only when the sign of the total changes; auxiliary memory means operable from a normal to an exceed condition by a carry signal of one sign when the capacity of the accumulator is exceeded in one direction and the flip-flop of the main memory is in one of its states and operable from an exceed to a normal condition by a carry signal of opposite sign when the capacity is reentered; said auxiliary memory means being operated from a normal to an exceed condition by a carry signal of said opposite sign when the capacity of the accumulator is exceeded in the opposite direction and the flip-flop of the main memory is in the other of its states and operated from an exceed to a normal condition by a carry signal of said one sign when the capacity is reentered; said main memory and said auxiliary memory cooperating to enable carry signals of the "fugitive one" type to cause "fugitive one" entries through the "fugitive one" transfer means only when the auxiliary memory means is in said normal condition; and indicia-bearing means controlled by the accumulator and operable to one position to indicate the true value of a positive total in the accumulator under the control of the flip-flop in one state thereof and to another position to indicate the true value of a negative total in the accumulator under the control of the flip-flop in its other state.

19. An electronic accumulator comprising a plurality of denominational orders, each including a plurality of tubes interconnected in ring fashion for operation in an additive or a subtractive manner; separate input means for each order for introducing additive entries thereto; further input means for each order for introducing subtractive entries thereto; means for transferring additive carry signals from each order to the next higher order when the capacity of the former is exceeded in an additive direction as the result of an additive entry; means for transferring subtractive carry signals from each order to the next higher order when the capacity of the former is exceeded in a subtractive direction as the result of a subtractive entry; "fugitive one" transfer means operable by carry signals of the "fugitive one" type from the highest order developed when the sign of the total is changed for introducing a corrective entry into the lowest order; a main memory including a bistable state flip-flop responsive to the carry signals of the "fugitive one" type from the highest order for enabling the operation of the "fugitive one" transfer means by the "fugitive one" type carry signals only when the sign of the total changes; auxiliary memory means operable from a normal to an exceed condition by a carry signal of one sign when the capacity of the accumulator is exceeded in one direction and the flip-flop of the main memory is in one of its states and operable from an exceed to a normal condition by a carry signal of opposite sign when the capacity is reentered; said auxiliary memory means being operated from a normal to an exceed condition by a carry signal of said opposite sign when the capacity of the accumulator is exceeded in the opposite direction and the flip-flop of the main memory is in the other of its states and operated from an exceed to a normal condition by a carry signal of said one sign when the capacity is reentered; said main memory and said auxiliary memory cooperating to enable carry signals of the "fugitive one" type to cause "fugitive one" entries through the "fugitive one" transfer means only when the auxiliary memory means is in said normal condition; and switching means connected to the tubes of the denominational orders for presetting an amount as to magnitude and sign into the accumulator; said switching means including a connection to each section of the flip-flop to preset the main memory in accordance with the sign of the amount preset into the accumulator.

20. An electronic accumulator comprising a plurality of denominational orders, each including a plurality of tubes interconnected in ring fashion for operation in an additive or a subtractive manner; separate input means for each order for introducing additive entries thereof; further input means for each order for introducing subtractive entries thereto; means for transferring additive carry signals from each order to the next higher order when the capacity of the former is exceeded in an additive direction as the result of an additive entry; means for transferring subtractive carry signals from each order to the next higher order when the capacity of the former is exceeded in a subtractive direction as the result of a subtractive entry; "fugitive one" transfer means operable by carry signals of the "fugitive one" type from the highest order developed when the sign of the total is changed for introducing a corrective entry into the lowest order; a main memory responsive to the carry signals of the "fugitive one" type from the highest order and having a first and a second condition of operation for enabling the operation of the "fugitive one" transfer means by the "fugitive one" type carry signals only when the sign of the total changes; auxiliary memory means operable from a normal to an exceed condition by a carry signal of one sign and other than of the "fugitive one" type when the capacity of the accumulator is exceeded in one direction and the main memory is in said first condition and operable from an exceed to a normal condition by a carry signal of opposite sign and other than of the "fugitive one" type when the capacity is reentered; said auxiliary memory means being operated from a normal to an exceed condition by a carry signal of said opposite sign when the capacity of the accumulator is exceeded in the opposite direction and the main memory is in said second condition and operated from an exceed to a normal condition by a carry signal of said one sign and other than of the "fugitive one" type when the capacity is reentered; said main memory being operable from one condition to the other by "fugitive one" carry signals only when the auxiliary memory means is in said normal condition.

21. An electronic accumulator comprising a plurality of denominational orders, each including a plurality of tubes interconnected for sequential operation in an additive or a subtractive manner; separate input means for each order for introducing additive entries thereto; further input means for each order for introducing subtractive entries thereto; means for transferring additive carry signals from each order to the next higher order when the capacity of the former is exceeded in an additive direction as the result of an additive entry; means for transferring subtractive carry signals from each order to the next higher order when the capacity of the former is exceeded in a subtractive direction as the result of a subtractive entry; "fugitive one" transfer means operable by carry signals of the "fugitive one" type from the highest order developed when the sign of the total is changed for introducing a corrective entry into the lowest order; a main memory responsive to the carry signals of the "fugitive one" type from the highest order and having a first and a second condition of operation for enabling the operation of the "fugitive one" transfer means by the "fugitive one" type carry signals only when the sign of the total changes; bistable auxiliary memory means responsive to carry signals other than of the "fugitive one" type for operation in one condition when the total in the accumulator is within capacity and in the other condition when the total is in excess of the accumulator capacity; and switching means under the joint control of the main memory and the auxiliary memory means for enabling the operation of the main memory by "fugitive one" signals of one sign from its first to its second condition of operation when the sign of the total is changed and from its second to its first conditon by "fugitive one" signals of the opposite sign when the sign of the total is changed oppositely but preventing carry signals developed upon returning the total to a value within the capacity from influencing the main memory.

22. An electronic accumulator comprising a plurality of denominational orders reversibly operable in an additive or a subtractive manner; a common switching member adapted to control the setting of an input device for each order for introducing additive or subtractive entries in the accumulator; means for transferring carry signals from each order to cause a transfer entry therein when the capacity of the former is exceeded in an additive or a subtractive direction as the result of an additive or a subtractive entry; "fugitive one" transfer means operable by carry signals of the "fugitive one" type from the highest order developed when the sign of the total is changed for introducing a corrective entry into the lowest order; and a control circuit responsive to carry signals from the highest order and adapted to control the operation of the "fugitive one" transfer means; said control circuit comprising a main memory means having a first stable state indicative of a positive content of the accumulator and a second stable state indicative of a negative content of the accumulator; an auxiliary memory means having a normal stable state indicative of a total within the capacity of the accumulator and an exceed stable state indicative of a total in excess of the capacity of the accumulator; a control member associated with each of the main memory means and the auxiliary memory means; a switching network adapted to receive carry signals from the highest order, comprising switching elements controlled from the control member of the main memory means and further switching elements controlled from the control member of the auxiliary memory means; and a switching device operable in unison with the common switching member to select a particular path in the switching network in accordance with the sign of a new entry in the accumulator; said main memory means being responsive to the carry signals from the highest order so that any change in the sign of the total in the accumulator affects the state of both the main memory means and the "fugitive one" transfer means whereby a carry signal of the "fugitive one" type is transmitted to the lowest order only when the sign of the total in the accumulator changes; said auxiliary memory means being operable from a normal to an exceed state in response to an additive carry signal from the highest order applied to the switching network when the capacity of the accumulator is exceeded in an additive direction and the main memory is in the first stable state, and operable from an exceed to a normal state by a subtractive carry signal when the capacity of the accumulator is reentered, said auxiliary memory means being operated from a normal to an exceed state in response to a subtractive carry signal from the highest order applied to the switching network when the capacity of the accumulator is exceeded in a subtractive direction and the main memory is in the second stable state, and operable from an exceed to a normal state by an additive carry signal when the capacity of the accumulator is reentered; said control member of the main memory means and the control member of the auxiliary memory means being controlled in accordance with the states of the main memory means and the auxiliary memory means respectively and cooperating to control the switching elements of the switching network whereby carry signals of the "fugitive one" type from the highest order cause "fugitive one" entries to be made in the lowest order through the "fugitive one" transfer means only when the auxiliary memory means is in said normal condition.

23. A reversible electronic accumulator comprising a plurality of denominational order blanks each including a plurality of tubes arranged for sequential operation in one direction for addition and in the opposite direction for subtraction; each of said tubes having a pair of control electrodes and having priming circuits connected to one control electrode of any adjacent preceding tube and to the other control electrode of any adjacent succeeding tube so that any conducting tube primes the to the additive carry signals of the "fugitive one" type and settable thereby to the other state as the sign of the total in the accumulator becomes positive; auxiliary memory means operable from a normal to an exceed condition by a subtractive carry signal when the capacity of the accumulator is exceeded in a negative direction and the main memory means is in said one state and operable from an exceed to a normal condition by an additive carry signal when the capacity is reentered; said auxiliary memory means being operable from a normal to an exceed condition by an additive carry signal when the capacity of the accumulator is exceeded in a positive direction and the main memory means is in said other state and operable from an exceed to a normal condition by a subtractive carry signal when the capacity is reentered; and said flip-flop and said auxiliary memory means cooperating to enable the operation of the "fugitive one" transfer means for subtractive "fugitive one" type carry signals as said flip-flop is changed from said other state to said one state and for additive "fugitive one" type carry signals as it is changed from said one state to said other state.

10. An electronic accumulator comprising a plurality of denominational orders reversibly operable in an additive or a subtractive manner; input means for each order for introducing additive and subtractive entries thereto; means for transferring carry signals from each order to the next higher order to cause a transfer entry therein when the capacity of the former is exceeded in an additive or a subtractive direction as the result of an additive or subtractive entry; "fugitive one" transfer means operable by carry signals of the "fugitive one" type from the highest order developed when the sign of the total is changed for introducing a corrective entry into the lowest order; a main memory responsive to the carry signals of the "fugitive one" type from the highest order and having a first and a second condition of operation for enabling the operation of the "fugitive one" transfer means by the "fugitive one" type carry signals only when the sign of the total changes; auxiliary memory means operable from a normal to an exceed condition by a carry signal of one sign when the capacity of the accumulator is exceeded in one direction and the main memory is in said first condition and operable from an exceed to a normal condition by a carry signal of opposite sign when the capacity is reentered; said auxiliary memory means being operated from a normal to an exceed condition by a carry signal of said opposite sign when the capacity of the accumulator is exceeded in the opposite direction and the main memory is in said second condition and operated from an exceed to a normal condition by a carry signal of said one sign when the capacity is reentered; and said main memory and said auxiliary memory cooperating to enable carry signals of the "fugitive one" type to cause "fugitive one" entries through the "fugitive one" transfer means only when the auxiliary memory means is in said normal condition; and positive and negative indicating means settable as to amount from the denominational orders and selectable as to sign under the control of the main memory.

11. An electronic accumulator comprising a plurality of denominational orders reversibly operable in an additive or a subtractive manner; input means for each order for introducing additive and subtractive entires thereto; means for transferring carry signals from each order to the next higher order to cause a transfer entry therein when the capacity of the former is exceeded in an additive or a subtractive direction as the result of an additive or subtractive entry; "fugitive one" transfer means operable by carry signals of the "fugitive one" type from the highest order developed when the sign of the total is changed for introducing a corrective entry into the lowest order; a main memory means including a bistable flip-flop responsive to the subtractive carry signals of the "fugitive one" type from the highest order and settable thereby to one state as the sign of the total in the accumulator becomes negative, and responsive to the additive carry signals of the "fugitive one" type and settable thereby to the other state as the sign of the total in the accumulator becomes positive; auxiliary memory means operable from a normal to an exceed condition by a subtractive carry signal when the capacity of the accumulator is exceeded in a negative direction and the flip-flop of the main memory means is in said one state and operable from an exceed to a normal condition by an additive carry signal when the capacity is reentered; said auxiliary memory means being operable from a normal to an exceed condition by an additive carry signal when the capacity of the accumulator is exceeded in a positive direction and the flip-flop of the main memory means is in said other state and operable from an exceed to a normal condition by a subtractive carry signal when the capacity is reentered; said flip-flop and said auxiliary memory means cooperating to enable the operation of the "fugitive one" transfer means for subtractive "fugitive one" type carry signals as said flip-flop is changed from said other state to said one state and for additive "fugitive one" type carry signals as it is changed from said one state to said other state; and indicia-bearing means controlled by the accumulator and operable to one position to indicate the true value of a positive total in the accumulator under the control of the flip-flop in said other state and to another position to indicate the true value of a negative total in the accumulator under the control of the flip-flop in said one state.

12. An electronic accumulator comprising a plurality of denominational orders reversibly operable in an additive or a subtractive manner; input means for each order for introducing additive and subtractive entries thereto; means for transferring carry signals from each order to the next higher order to cause a transfer entry therein when the capacity of the former is exceeded in an additive or a subtractive direction as the result of an additive or subtractive entry; "fugitive one" transfer means operable by carry signals of the "fugitive one" type from the highest order developed when the sign of the total is changed for introducing a corrective entry into the lowest order; a main memory including a two-section flip-flop operable by the carry signals of the "fugitive one" type from the highest order for enabling the operation of the "fugitive one" transfer means by the "fugitive one" type carry signals only when the sign of the total changes; auxiliary memory means operable from a normal to an exceed condition by a carry signal of one sign when the capacity of the accumulator is exceeded in one direction and the flip-flop of the main memory is in one state and operable from an exceed to a normal condition by a carry signal of opposite sign when the capacity is reentered; said auxiliary memory means being operated from a normal to an exceed condition by a carry signal of said opposite sign when the capacity of the accumulator is exceeded in the opposite direction and the flip-flop of the main memory is in the other of its states and operated from an exceed to a normal condition by a carry signal of said one sign when the capacity is reentered; said main memory and said auxiliary memory cooperating to enable carry signals of the "fugitive one" type to cause "fugitive one" entries through the "fugitive one" transfer means only when the auxiliary memory means is in said normal condition; and switching means connected to the denominational orders for presetting an amount as to magnitude and sign into the accumulator; said switching means including a connection to each section of the flip-flop to preset the main memory in accordance with the sign of the amount preset into the accumulator.

13. An electronic accumulator comprising a plurality of denominational orders reversibly operable in an additive or a subtractive manner; input means for each order for introducing additive and subtractive entries thereto; means for transferring carry signals from each order to the next higher order to cause a transfer entry therein when the capacity of the former is exceeded in an additive or a subtractive direction as the result of an additive or subtractive entry; "fugitive one" transfer means operable by carry signals of the "fugitive one" type from the highest order developed when the sign of the total is changed for introducing a corrective entry into the lowest order; main memory means responsive to the carry signals of the "fugitive one" type from the highest order and having a first and a second condition of operation for enabling the operation of the "fugitive one" transfer means by the "fugitive one" type carry signals only when the sign of the total changes; separate paths from the highest denominational order to the main memory means for the "fugitive one" signals of opposite signs so that "fugitive one" signals of one sign operate the main memory means to its first condition and "fugitive one" signals of the other sign operate the main memory means to its second condition; bistable auxiliary memory means responsive to carry signals out of the highest order for operation in one condition when the total in the accumulator is within capacity and in the other condition when the total is in excess of the accumulator capacity; and switching means under the joint control of the main memory means and the auxiliary memory means for enabling the operation of the main memory means by "fugitive one" signals of one sign from its first to its second condition of operation when the sign of the total is changed and from its second to its first condition by "fugitive one" signals of the opposite sign when the sign of the total is changed oppositely.

14. An electronic accumulator comprising a plurality of denominational orders; each including a plurality of tubes interconnected for reversible operation to perform addition and subtraction; separate input means for each order selectively operable to introduce additive entries and subtractive entries thereto; means for transferring additive carry signals from each order to the next higher order when the capacity of the former is exceeded in an additive direction as the result of an additive entry; means for transferring subtractive carry signals from each order to the next higher order when the capacity of the former is exceeded in a subtractive direction as the result of a subtractive entry; "fugitive one" transfer means operable by carry signals of the "fugitive one" type from the highest order developed when the sign of the total is changed for introducing a corrective entry into the lowest order; a main memory responsive to the carry signals of the "fugitive one" type from the highest order and having a first and a second condition of operation for enabling the operation of the "fugitive one" transfer means by the "fugitive one" type carry signals only when the sign of the total changes; auxiliary memory means operable from a normal to an exceed condition by a carry signal of one sign when the capacity of the accumulator is exceeded in one direction and the main memory is in said first condition and operable from an exceed to a normal condition by a carry signal of opposite sign when the capacity is reentered; said auxiliary memory means being operated from a normal to an exceed condition by a carry signal of said opposite sign when the capacity of the accumulator is exceeded in the opposite direction and the main memory is in said second condition and operated from an exceed to a normal condition by a carry signal of said one sign when the capacity is reentered; and said main memory and said auxiliary memory cooperating to enable carry signals of the "fugitive one" type to cause "fugitive one" entries through the "fugitive one" transfer means only when the auxiliary memory means is in said normal condition.

15. An electronic accumulator comprising a plurality of denominational orders, each including a plurality of tubes interconnected in ring fashion for operation in an additive or a subtractive manner; separate input means for each order for introducing additive entries thereto; further input means for each order for introducing subtractive entries thereto; means for transferring additive carry signals from each order to the next higher order when the capacity of the former is exceeded in an additive direction as the result of an additive entry; means for transferring subtractive carry signals from each order to the next higher order when the capacity of the former is exceeded in a subtractive direction as the result of a subtractive entry; "fugitive one" transfer means operable by carry signals of the "fugitive one" type from the highest order developed when the sign of the total is changed for introducing a corrective entry into the lowest order; a main memory responsive to the carry signals of the "fugitive one" type from the highest order and having a first and a second condition of operation for enabling the operation of the "fugitive one" transfer means by the "fugitive" one" type carry signals only when the sign of the total changes; auxiliary memory means operable from a normal to an exceed condition by a carry signal of one sign when the capacity of the accumulator is exceeded in one direction and the main memory is in said first condition and operable from an exceed to a normal condition by a carry signal of opposite sign when the capacity is reentered; said auxiliary memory means being operated from a normal to an exceed condition by a carry signal of said opposite sign when the capacity of the accumulator is exceeded in the opposite direction and the main memory is in said second condition and operated from an exceed to a normal condition by a carry signal of said one sign when the capacity is reentered; and said main memory and said auxiliary memory cooperating to enable carry signals of the "fugitive one" type to cause "fugitive one" entries through the "fugitive one" transfer means only when the auxiliary memory means is in said normal condition.

16. An electronic accumulator comprising a plurality of denominational orders, each including a plurality of tubes interconnected in ring fashion for operation in an additive or a subtractive manner; separate input means for each order selectively operable to introduce additive amount entries and subtractive amount entries thereto; selectable control means for causing an amount entry to be introduced in an additive or a subtractive manner; means for transferring additive carry signals from each order to the next higher order when the capacity of the former is exceeded in an additive direction as the result of an additive amount entry; means for transferring subtractive carry signals from each order to the next higher order when the capacity of the former is exceeded in a subtractive direction as the result of a subtractive amount entry; "fugitive one" transfer means operable by carry signals of the "fugitive one" type from the highest order developed when the sign of the total is changed for introducing a corrective entry into the lowest order; a main memory responsive to the carry signals of the "fugitive one" type from the highest order and having a first and a second condition of operation for enabling the operation of the "fugitive one" transfer means by the "fugitive one" type carry signals only when the sign of the total changes; auxiliary memory means operable from a normal to an exceed condition by a carry signal of one sign when the capacity of the accumulator is exceeded in one direction and the main memory is in said first condition and operable from an exceed to a normal condition by a carry signal of opposite sign when the capacity is reentered; said auxiliary memory means being operated from a normal to an exceed condition by a carry signal of said opposite sign when the capacity of the accumulator is exceeded in the opposite direction and the main memory is in said second condition and operated from an exceed to a normal condition by a carry signal of said one sign when the capacity is reentered; said main memory and said auxiliary memory cooperating to enable carry signals of the "fugiadjacent tubes, one corresponding control electrode of each tube being connected to an additive entry pulse line and the other corresponding control electrode of each tube being connected to a subtractive entry pulse line whereby the application of an input pulse to a control electrode of a tube having the other control electrode thereof primed renders the primed tube conducting.

References Cited in the file of this patent

UNITED STATES PATENTS

| | | |
|---|---|---|
| 2,390,441 | Keen | Dec. 4, 1945 |
| 2,533,739 | Mumma | Dec. 12, 1950 |
| 2,719,227 | Gordon | Sept. 27, 1955 |

FOREIGN PATENTS

| | | |
|---|---|---|
| 735,750 | Great Britain | Aug. 24, 1955 |

UNITED STATES PATENT OFFICE
CERTIFICATE OF CORRECTION

Patent No. 2,919,855                                                                              January 5, 1960

Cebern B. Trimble

It is hereby certified that error appears in the printed specification of the above numbered patent requiring correction and that the said Letters Patent should read as corrected below.

Column 7, line 37, for "hundred" read -- "hundreds" --; column 10, line 37, for "witch" read -- switch --; column 12, line 71, for "(1)111" read -- (1)110 --; column 13, line 74, for "The three" read -- Three --; column 22, line 75, for "resistor 848" read -- resistor 484 --; column 33, line 62, for "pulse" read -- pulses --; column 37, line 65, for "entires" read -- entries --; column 42, line 74, for "thereof" read -- thereto --; column 44, line 68, for "blanks" read -- banks --.

Signed and sealed this 7th day of June 1960.

(SEAL)
Attest:

KARL H. AXLINE                                                       ROBERT C. WATSON
Attesting Officer                                                 Commissioner of Patents

UNITED STATES PATENT OFFICE
CERTIFICATE OF CORRECTION

Patent No. 2,919,855                                                                  January 5, 1960

Cebern B. Trimble

It is hereby certified that error appears in the printed specification of the above numbered patent requiring correction and that the said Letters Patent should read as corrected below.

Column 7, line 37, for ‡"hundred"' read -- "hundreds" --; column 10, line 37, for "witch" read -- switch --; column 12, line 71, for "(1)111" read -- (1)110 --; column 13, line 74, for "The three" read -- Three --; column 22, line 75, for "resistor 848" read -- resistor 484 --; column 33, line 62, for "pulse" read -- pulses --; column 37, line 65, for "entires" read -- entries --; column 42, line 74, for "thereof" read -- thereto --; column 44, line 68, for "blanks" read -- banks --.

Signed and sealed this 7th day of June 1960.

(SEAL)
Attest:

KARL H. AXLINE                                                     ROBERT C. WATSON
Attesting Officer                                          Commissioner of Patents